United States Patent
Duzak

(10) Patent No.: US 11,709,993 B2
(45) Date of Patent: Jul. 25, 2023

(54) EFFICIENT CONCURRENT INVOCATION OF SHEET DEFINED FUNCTIONS INCLUDING DYNAMIC ARRAYS

(71) Applicant: Microsoft Technology Licensing, LLC, Redmond, WA (US)

(72) Inventor: Jeffrey James Duzak, Redmond, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 106 days.

(21) Appl. No.: 17/332,493

(22) Filed: May 27, 2021

(65) Prior Publication Data
US 2022/0382970 A1 Dec. 1, 2022

(51) Int. Cl.
G06F 40/18 (2020.01)
G06F 16/332 (2019.01)
G06F 16/31 (2019.01)
G06F 40/123 (2020.01)
G06F 40/157 (2020.01)

(52) U.S. Cl.
CPC ............ *G06F 40/18* (2020.01); *G06F 16/328* (2019.01); *G06F 16/332* (2019.01); *G06F 40/123* (2020.01); *G06F 40/157* (2020.01)

(58) Field of Classification Search
CPC ...... G06F 16/328; G06F 16/332; G06F 40/18; G06F 40/123; G06F 40/157
See application file for complete search history.

(56) References Cited

U.S. PATENT DOCUMENTS

| | | |
|---|---|---|
| 9,037,961 B1 | 5/2015 | Mansell |
| 10,545,953 B2 | 1/2020 | Becker et al. |
| 10,891,434 B2 | 1/2021 | Peyton Jones et al. |
| 11,194,793 B1 * | 12/2021 | Srivastava ............... G06F 16/93 |
| 2012/0110001 A1 * | 5/2012 | Young .................... G06F 40/18 |
| | | 707/769 |

(Continued)

FOREIGN PATENT DOCUMENTS

WO WO-2021242177 A1 * 12/2021

OTHER PUBLICATIONS

Bock et al., "On the semantics for spreadsheets with sheet-defined functions", Mar. 7, 2020, published by Elsevier Ltd, pp. 11 (Year: 2020).*

(Continued)

*Primary Examiner* — Chau T Nguyen
(74) *Attorney, Agent, or Firm* — Schwegman Lundberg & Woessner, P.A.

(57) ABSTRACT

Systems and methods are directed to providing efficient and fast invocation of concurrent sheet defined functions (SDFs) including dynamic arrays by front-loading the work. At SDF creation time, a SDF cell table, a formula table, and a spill area table are generated. The SDF cell table represents cells from a worksheet that are used for the SDF. The formula table comprises an index of formulas used by the SDF, whereby index identifiers are stored in cells of the SDF cell table. The spill area table comprises an index of spill areas where each dynamic array may automatically spill into. The SDF cell table, formula table, and spill area table are shared between a plurality of invocations of the SDF during invocation time.

20 Claims, 15 Drawing Sheets

(56) References Cited

U.S. PATENT DOCUMENTS

2013/0067305 A1* 3/2013 Golan .................. G06F 40/18
715/219
2020/0167415 A1* 5/2020 Peyton Jones .......... G06F 40/18

OTHER PUBLICATIONS

McCutchen et al., "Elastic Sheet-Defined Functions: Generalising Spreadsheet Functions to Variable-Size Input Arrays", Nov. 2018, Microsoft, pp. 27 (Year: 2018).*

Balson, Dermot, et al., "User Defined Spreadsheet Functions in Excel", in Repository of arXiv:1211.6781v1, Nov. 28, 2012, 11 Pages.

"International Search Report and Written Opinion Issued in PCT Application No. PCT/US22/027193", dated Jul. 29, 2022, 11 Pages.

* cited by examiner

EFFICIENT CONCURRENT INVOCATION OF SHEET DEFINED FUNCTIONS INCLUDING DYNAMIC ARRAYS

TECHNICAL FIELD

The subject matter disclosed herein generally relates to spreadsheets or worksheets. Specifically, the present disclosure addresses systems and methods that front-load operations onto an initial creation of a sheet defined function (SDF) in order to efficiently and quickly invocate the SDF in the future.

BACKGROUND

In the context of spreadsheets, a user defined function (UDF) is a function that a user can create in a spreadsheet application beyond all built-in functions. Sheet defined functions (SDFs) is a version of UDFs which converts an area of a user's spreadsheet into a new function that can then be called from any formula in a spreadsheet workbook. The SDF is a function that is defined by an example worksheet with specially-identified input and output cells. Any specially-identified input cell range of an SDF requires input arrays of a call to the SDF to be the same size.

BRIEF DESCRIPTION OF THE DRAWINGS

Some embodiments are illustrated by way of example and not limitation in the figures of the accompanying drawings.

DETAILED DESCRIPTION

Figure 1:
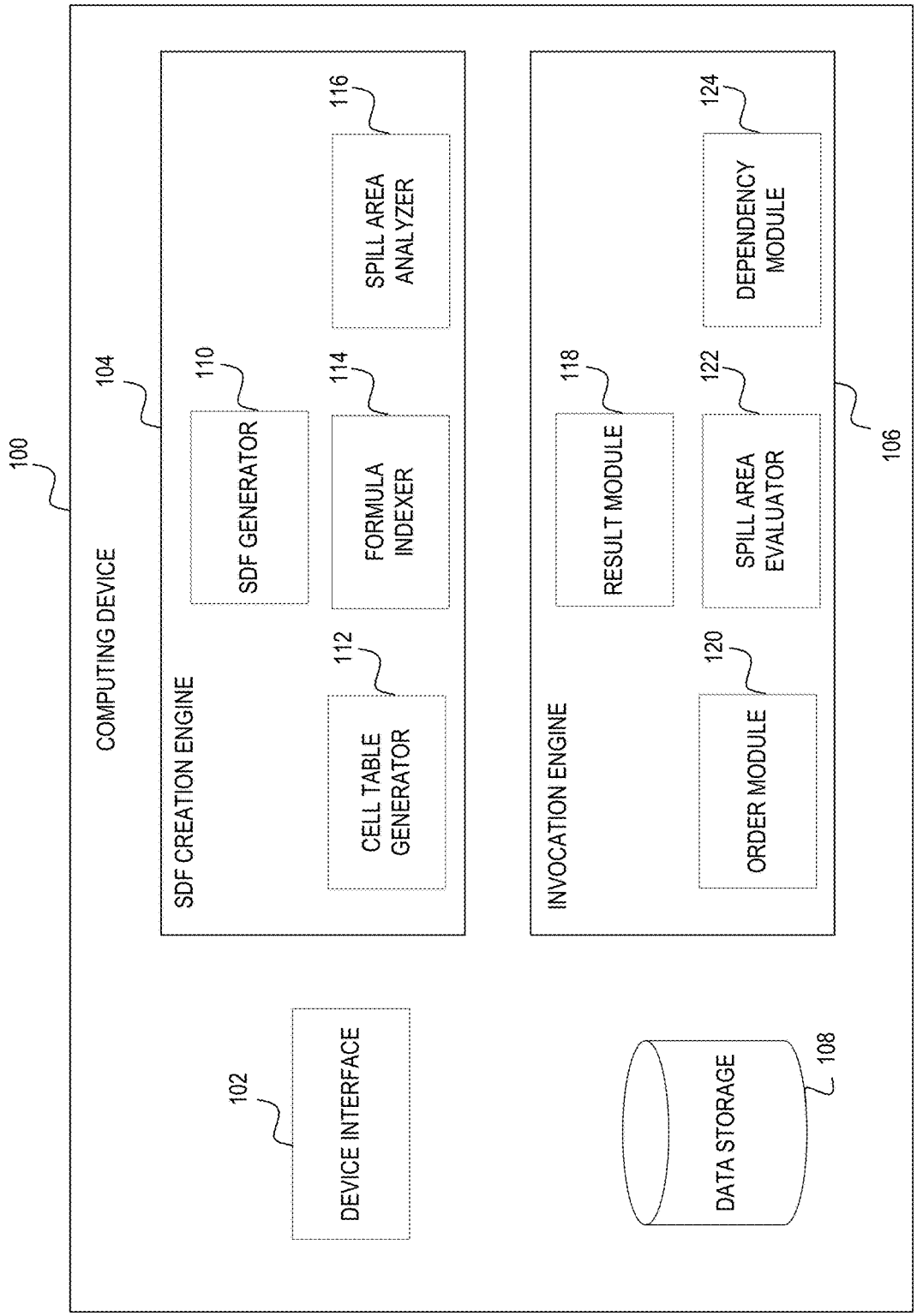
FIG. 1 is a diagram illustrating a computing device suitable for providing efficient concurrent invocation of sheet defined functions including dynamic arrays, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Sheet defined functions (SDFs) are a way to convert an area of a spreadsheet (also referred to herein as a "worksheet") into a new function. The new function can then be called from any formula in the spreadsheet workbook. In order for a new invocation of the SDF to be evaluated, all formulas that are within a moat (e.g., an area of the spreadsheet that contains everything that is needed in order to define the SDF including input cell(s) and output cell) need to be evaluated. A naïve implementation of SDFs clones data structures associated with each SDF including all of the formula classes and a cell table (e.g., copy the entire moat). The formula classes need to be copied because the formula classes hold both results from the formulas as well as an ordering of the formula. These data structures must be cloned for each invocation of the SDF, which causes conventional, concurrent SDF invocations to be very inefficient and slow.

As a simple example, assume a user wants to convert data from Fahrenheit to Celsius. The user can enter into cell A1 the value "68" and enter into cell B1 the formula "=((a1)−32)/9*5)." In order to create an SDF call "F to C," first the user specifies a moat—an area of the sheet that contains everything that is needed in order to define this function. In this case, it is A1 and B1. Then, the user defines the input cell (i.e., A1) and the output cell (i.e., B1). In order for new invocations of this SDF to be evaluated, the system needs to evaluate all formulas that are within the moat. A naïve way to do the evaluation is, for each invocation, to copy the entire moat and formulas, evaluate the formulas, store the new result into the copied formulas, go to the formula the user has indicated to be the final result, and grab the result from that formula. But this is inefficient because it requires cloning the cell table and all the formulas for every invocation.

Dynamic arrays are a feature of a spreadsheet application (e.g., Excel) in which a multi-valued formula result (e.g., an array) automatically spills into an appropriate number of cells. Prior to dynamic arrays, a user had to decide beforehand how many cells to spill the result into. With dynamic arrays, the size of the array depends on an actual formula evaluation, and can vary from evaluation to evaluation. For example, a formula filters a set of products to just a set whose sales exceeds a predetermined threshold. One evaluation of the formula may produce a set of ten products. When the data changes and the formula is evaluated again, the same formula may now produce a result with twelve products. With dynamic arrays, the original result will automatically spill across ten cells and the new result will automatically spill across twelve cells. Thus, a dynamic array is an array formula where the user does not have to anticipate the size in advance. Some of the functionalities needed to support dynamic arrays currently can only run on a main thread, thus preventing conventional SDF evaluation from being used during multi-threaded recalculations.

Example embodiments provide technical solutions that address the technical problem of providing efficient and fast invocation of concurrent SDFs including dynamic arrays. Generally, the SDF will be evaluated or invoked many times and can be invoked on different threads at the same time. Example embodiments tackle this technical problem by front-loading as much work as possible at SDF creation time in order to minimize the amount of work needed at SDF invocation time. Specifically, example systems and methods generate, at SDF creation time, a SDF cell table representing cells being used on a corresponding spreadsheet, a formula index or table that indexes formulas used by the SDF, and a spill area table indicating labels or indices of all potential spill area (e.g., area of cells) where each dynamic array may automatically spill into, whereby these tables/indices are shared between all invocations of the same SDF. During invocation of the SDF, these various tables are referenced to obtain values and formulas use to calculate and/or populate one or more cells of the spreadsheet with the result. Additionally, the example systems and methods allow both concurrent execution of SDFs on multiple threads and nested execution of one SDF from within another.

While example embodiments discuss making SDF invocation thread-safe and fast, the most difficult technical problems relate to dynamic array resizing. In particular, dynamic arrays require two important mechanisms: (1) a mechanism for determining whether a cell reference refers to a spill area of a dynamic array and, if so, which array; and (2) a mechanism for re-dirtying a formula that already calculated successfully but references a previously empty cell that a dynamic array has since spilled into. Thus, example embodiments also provide a mechanism to evaluate formulas for the SDF in dependency order (which can vary between different SDF invocations); a mechanism to efficiently resolve cell references which may refer to the spill area of the dynamic array; and a mechanism to efficiently detect formulas that depend on the potential spill areas of the dynamic array, in order to properly re-dirty the formulas if the dynamic array spills into those areas, all while sharing the same cell table structure (i.e., the SDF cell table, formula table, and spill area table) between all invocations of the same SDF.

FIG. 1 is a diagram illustrating a computing device 100 suitable for efficiently and quickly invoking SDFs by front-loading operations at SDF creation time, in accordance with example embodiments. In one embodiment, the computing device 100 is a client device of a user that is creating and invoking SDFs. In an alternative embodiment, the computing device 100 is a server that is accessible by the client device of the user via a network (e.g., the Internet, wireless network, cellular network, or a Wide Area Network (WAN)). As such, the computing device 100 may comprise, but is not limited to, a smartphone, tablet, laptop, multi-processor systems, microprocessor-based or programmable consumer electronics, game consoles, set-top boxes, a server, or any other communication device that can access a network. In example embodiments, the computing device 100 comprises a display module (not shown) to display information (e.g., in the form of user interfaces).

The computing device 100 is configured to create SDFs, front-load operations at creation time, and perform evaluations of the SDFs at invocation time. In order to perform these operations, the computing device 100 comprises a device interface 102, a SDF creation engine 104, an invocation engine 106, and a data storage 108 all configured to communicate with each other (e.g., via a bus, shared memory, or a switch). The computing device 100 may comprise other components (not shown) that are not pertinent to example embodiments. Furthermore, any one or more of the components (e.g., engines, interfaces, modules, storage, generators, evaluators) described herein may be implemented using hardware (e.g., a processor of a machine) or a combination of hardware and software. Moreover, any two or more of these components may be combined into a single component, and the functions described herein for a single component may be subdivided among multiple components.

The device interface 102 is configured to receive and cause display of various information both during SDF creation and invocation times. For example, the device interface 102 can receive, via a user interface presented by the device interface 102, inputs to create SDFs. Similarly, the device interface 102 can receive, via the user interface, indications to invoke SDFs. In response to the invocation, the device interface 102 can present a result in the spreadsheet (e.g., displayed on the user interface).

The SDF creation engine 104 is configured to manage the creation of SDFs and the front-loading of operations during SDF creation time. To enable these operations, the SDF creation engine 104 comprises a SDF generator 110, a cell table generator 112, a formula indexer 114, and a spill area analyzer 116. The SDF generator 110 receives, via the device interface 102, inputs for creating the SDF and manages (e.g., triggers and monitors) the other components of the SDF creation engine 104.

In example embodiments, a user action triggers the creation of the SDF. For example, the user may select a button displayed on a user interface that allows the user to create the SDF. In response, a popup dialog (or other interface/window) is presented that asks the user to input an area of the SDF or moat (e.g., rectangular area on the original worksheet/spreadsheet that contains all the formulas and data that will make up the SDF), which cell(s) are the inputs, and which cell(s) are the output. The SDF generator 110 receives, via the device interface 102, this information and works with the other components of the SDF creation engine 104 to create the SDF along with the sharable tables.

If the user has created an SDF and some formulas which make calls to the SDF, and the user changes something in the SDF moat, the SDF itself and the formulas that call it get updated by the SDF generator 110. Therefore, an example embodiment may add support for SDFs into an existing dependency mechanism.

The cell table generator 112 is configured to create the SDF cell table that is shared between different invocations of the SDF. The SDF cell table comprises the maximum amount of information that can be shared between all formula invocations and comprises a "shallow clone" of the moat's cell table. The cell table generator 112 does not clone the moat cell table for every invocation of the SDF, just once upon SDF creation.

Conventionally, there are two pieces of information that are stored into each cell. The first piece of information is a type of data that is in the cell (e.g., numberType, stringType, BooleanType, formulaType, emptyType) and the second piece of information is the value or, if it is a formula, a pointer to a formula class in a formula table. The formula class, itself, holds the result of the formula. For example, if the type is number, then the value is that number.

In contrast, in preparing the SDF cell table for use during SDF invocation, the cell table generator 112 does not use formulaType with a pointer to the formula class. Instead, the cell table generator 112 changes the type to indexToFormulaType with a value that is an index that can be looked up in a table of formulas generated by the formula indexer 114.

The formula indexer 114 is configured to generate the table or index of formulas at SDF creation time. The order in which formulas are evaluated matters. For example, for the Fahrenheit to Celsius formula, each portion of the equation can be in a different cell. For instance, cell A1 can have the Fahrenheit value to be converted, cell B1 is the equation (A1-32), cell C1 is the equation (B2)/9, and cell D1 is the equation C1*5. Thus, the order of the formulas has to be performed in the right order to obtain the right outcome. However, the order can differ from calculation to calculation. If there is an "if" statement, for example, the formula that the output cell depends on varies based on the values that are obtained. If the order of the formula is stored in the formula class, then the system will have to duplicate those formula classes for each invocation since it can vary and it can be invoked in different threads at the same time. To avoid the cost of having to copy the formula classes with every invocation, the formula indexer 114 indexes all the formulas so that the order in which the formulas are evaluated are stored separate from the formula classes themselves. Thus, the system just uses indices to formulas to describe the order in which formulas should be evaluated. Likewise, this allows the system to store the results of the formulas separately from the formula classes themselves.

Figure 2A:
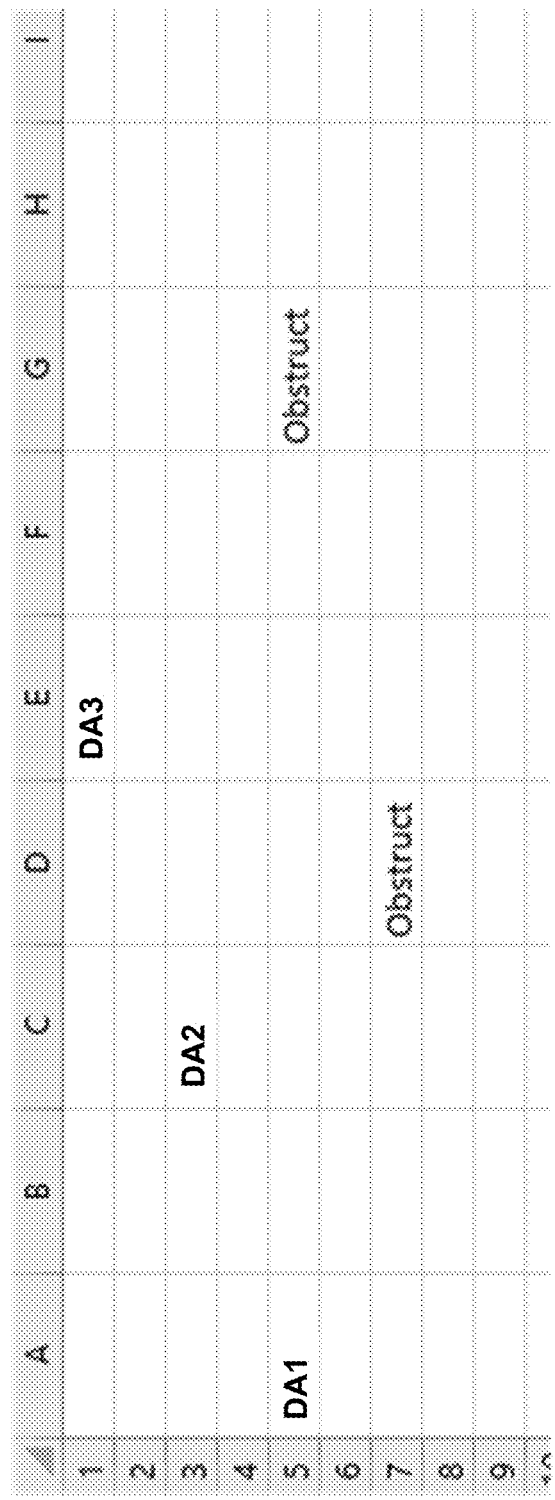
FIG. 2A is an example worksheet showing a combination of dynamic arrays, according to some example embodiments.

The spill area analyzer 116 is configured to determine potential spill areas for dynamic arrays, label the spill areas, and create a spill area table that indicates the labels and dynamic arrays which can spill into each spill area. Referring to FIG. 2A, for example, a spreadsheet is shown with a combination of dynamic arrays (DA) and obstructions (Obstruct). Each empty cell can have some set of one or more dynamic arrays potentially spill into it. A dynamic array can spill into any size rectangle downward and/or to the right from their home cell (e.g., a cell the array is typed into). When a dynamic array tries to spill and hits an obstruction, it will return an error.

Figure 2B:
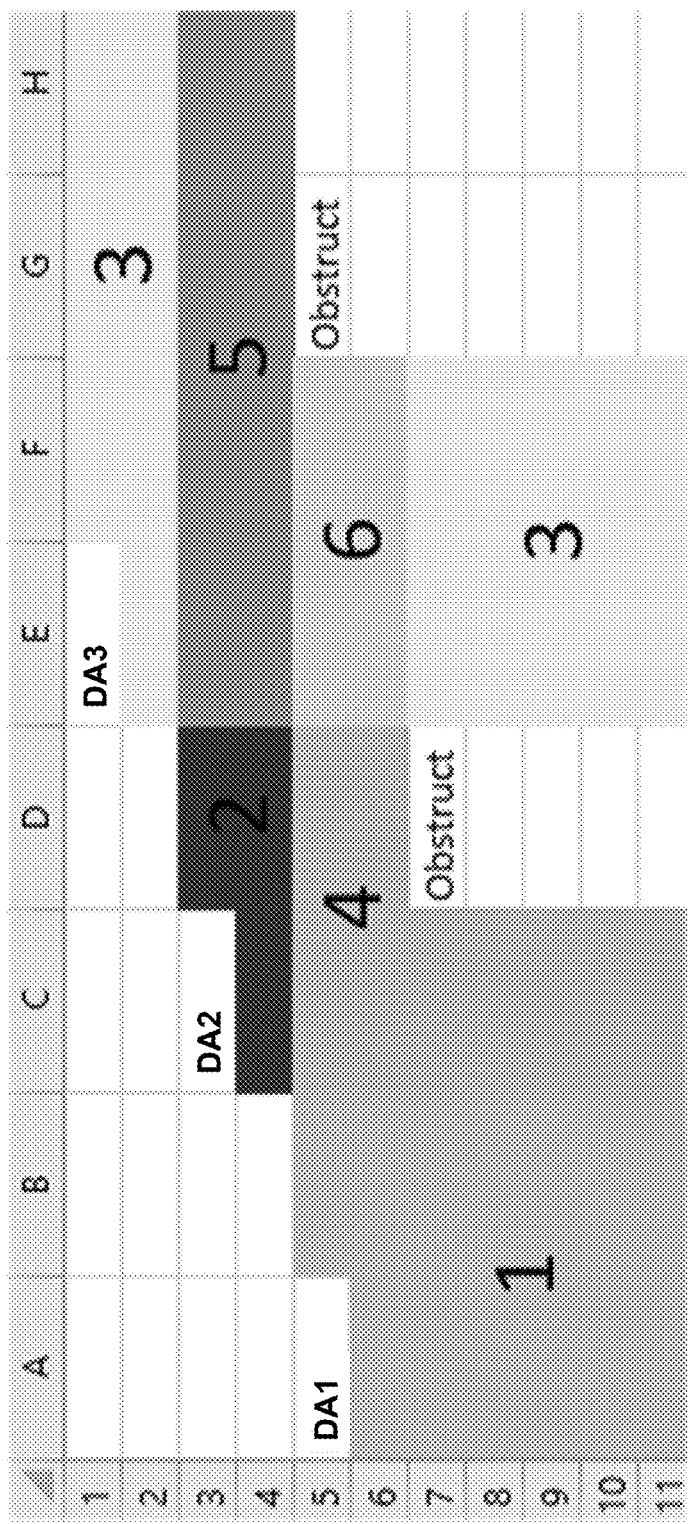
FIG. 2B is an example worksheet showing spill areas with labels, according to some example embodiments.

In example embodiments, the spill area analyzer 116 analyzes the dynamic arrays on the worksheet (also referred to herein as "spreadsheet") and all the other cell values to see where each dynamic array can spill into and divide the worksheet up into regions (or areas) where each region is defined so that the set of dynamic arrays that can spill into any cell in that region is the same for every cell in that region. Thus, by grouping together all of the cells that have the same set of dynamic arrays that can potentially spill into them, spill areas are generated and each spill area is given an index number or label, as shown in FIG. 2B. Note that since dynamic arrays can only spill into empty cells, any cell that is part of a spill area would have originally been empty. It would have contained the type emptyType and no value. The spill area analyzer 116, instead, stores into the cell the type spillAreaType and a value which is an index to the spill area.

For example, region 3 can only be spilled into by dynamic array 3. Dynamic array 2 cannot spill into region 3 because region 3 is above it. There is also a lower region 3 because dynamic array 2 and dynamic array 1 are blocked from spilling into lower region 3 by an obstruction under region 4. When a cell in region 3 needs to check whether the cell has a value from a dynamic array, it figures out which dynamic array it needs to look at based on its spill area.

Region 4 is a region where either dynamic array 1 or dynamic array 2, but not both can spill into it. During invocation, when a formula is "=C7," for example, the invocation engine 106 needs to figure out which value should be retrieved for that cell. As will be discussed in more detail below, the invocation engine 106 determines that C7 is within spill region 4 and accesses a table that records, for a particular invocation of the SDF, what dynamic array has spilled into region 4. Each invocation can have a different recordable table, but the indices (e.g., the spill area table) are shared between every invocation. Thus, the spill area analyzer 116 sets up the indices of what dynamic array can spill into spill areas resulting in a spill table that is generated at SDF creation time.

To better understand the operations of the various components of the SDF creation engine 104 occurring at SDF creation time, a more detailed discussion of the operations performed by the various components of the SDF creation engine 104 is now provided. Initially, a user input to the SDF generator 110 includes an indication of the moat where all the formulas and data that makes up the SDF is located. The SDF engine 104 (e.g., the SDF generator 110) iterates over the moat and counts the number of formulas encountered. Then, the SDF engine 104 (e.g., the formula indexer 114) allocates a table of formula pointers large enough to hold pointers to all of the formulas that were encountered.

The SDF cell table is different from a source cell table in several ways. First, populated areas of each span are normalized (e.g., made identical) across all cell blocks. Secondly, all pointers to formulas are replaced by indices to formulas. The indices range from 0 to N−1, where N is a total number of formulas within the moat. Thirdly, each empty cell into which any dynamic array can possibly spill into is assigned to a specific spill area, and the index or label of that spill area is stored into the empty cell. A spill area is defined as a portion of the cell table for which a set of dynamic arrays that could potentially spill into any specific cell of the spill area is the same.

Cell blocks and spans are a mechanism for allowing a cell table to be sparse. The full range of 1 m rows is divided up into 256k cell blocks with each cell block responsible for a block of four rows. A cell block can either exist or not exist, depending on if there are any populated cells at all within the set of rows the cell block is responsible for. Within a cell block, each row can either exist or not exist, depending on if there are any populated cells at all within that row.

The full range of 16k columns is divided up into 16 separate spans, each responsible for a block of 1024 columns. Within a span, a populated range is maintained, which is the minimum contiguous range of columns that fully contains all of the populated cells. Spans are specific to cell blocks, so are only affected by the populated cells within the same cell block. For example, if a user has data solely within the range B2:E10, a sparse cell table contains three cell blocks, one for rows 1-4, one for rows 5-8, and one for rows 9-12. Within the first cell block, only rows 2-4 would be populated. Within the second cell block, all rows would be populated. Within the third cell block, only the first two rows, those corresponding to rows 9-10 would be populated.

Within each of these cellblocks, the span responsible for columns 1 through 1024 would have a populated range from column 2 (B) through 5 (E). If the user then enters data in cell G10, within the third cell block (the one responsible for rows 9-12), the populated range for the first span would be updated to extend from column 2 (B) through 7 (G). The spans within the other cell blocks would remain unchanged.

The SDF engine 104 (e.g., the SDF generator 110 or cell table generator 112) normalizes the spans and initializes a set of spans for the SDF. Each span is responsible for a fixed set of columns (e.g., 1024 columns). Within each span, the populated set of columns is a single contiguous set of columns, the smallest contiguous set necessary to include all cells that contain a value. To start, the SDF engine 104 initializes each span to have an empty populated area. Then, the SDF engine 104 iterates through all the cellblocks in the moat in the source workbook. For each of the 16 spans in the cellblock, the SDF engine 104 unions the populated area of that span with the populated area of the corresponding span in the SDF's set of spans, and stores that union into the SDF's span.

Figure 3:
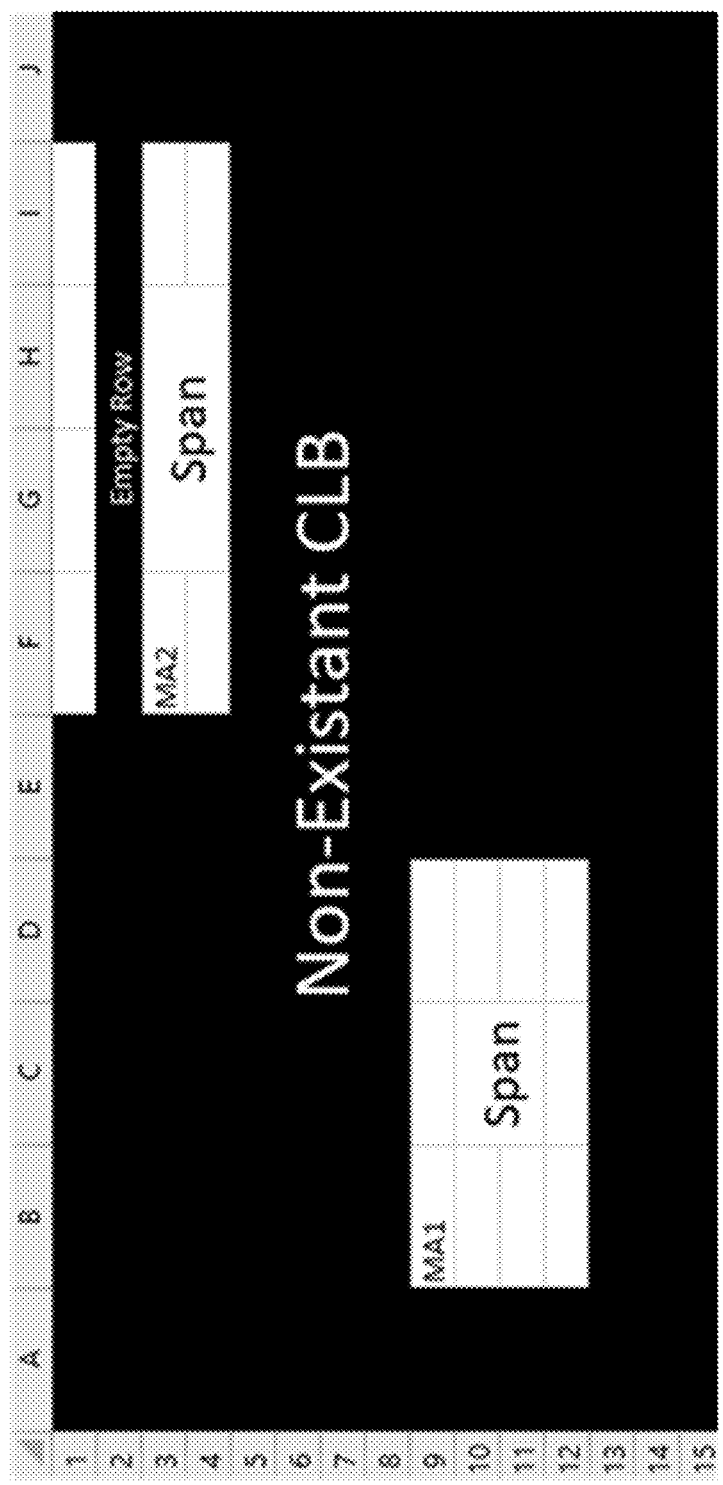
FIG. 3 is an example worksheet used to illustrate normalization of spans, according to some example embodiments.

Referring to FIG. 3, the SDF engine 104 will start out with a set of spans that are all empty. The SDF engine 104 iterates through the cellblocks in the moat. For the first cellblock, for the first span (e.g., the span responsible for columns A through AMJ), the populated area includes columns F-I. Union F-I with the empty set, and the result F-I is obtained. This result set is stored in the SDF's first span.

The SDF engine 104 moves onto the next populated cellblock (e.g., rows 9-12). For the first span of that cellblock, the SDF engine 104 unions the populated area (B-D) with the populated area in the SDF's first span (F-I), and store the result (B-I) into the SDF's first span. Note that here, "union" means finding a minimum set of contiguous columns that contains all the columns in the original ranges. This is different from the typical mathematical definition of a union, which results in the set {B-D, F-I}. Once the SDF engine 104 completes iterating cellblocks in the original moat, the "normalized" spans for SDF creation is computed.

Subsequently, cellblocks for the SDF cell table are allocated by using the normalized spans. Hence, the cellblocks for the SDF cell table may contain more cells than the corresponding cellblocks in the original worksheet.

The SDF engine 104 (e.g., the spill area analyzer 116) creates a count of spill areas detected so far, and initializes it to zero. The SDF engine 104 then creates a plex of spill area classes, where each class represents a single spill area and holds the indices of the dynamic arrays that could spill into that area. A mapping (or table) that can efficiently look up a spill area corresponding to a specific set of dynamic arrays is then mapped (or generated).

The SDF engine 104 (e.g., the formula indexer 114) then creates a count of formulas detected so far, and initialize it to zero. The SDF engine 104 also creates a variable to hold the index of the most recently encountered dynamic array on the current row. This can be referred to as the "current row array" index. The current row array index is initialized to an empty value.

The SDF engine 104 iterates simultaneously over the cells in the SDF cell table and the cells in the original worksheet. Note that since the spans for the SDF have been normalized, the SDF cell table may contain more populated cells than the worksheet. Within the SDF cell table, in addition to maintaining a pointer to the current cell being iterated over, a "left" pointer to the cell immediately to the left of the current cell, an "above" pointer to the cell immediately above the current cell, and an "above left" pointer to the cell immediately to the left of the "above" cell are maintained.

For each cell, if the cell exists in the original worksheet (or spreadsheet) and the original cell contains a static value (e.g., a number, string, Boolean, or error entered directly into the cell, not the result of any formula), that value is copied into the SDF cell. However, if the cell exists in the original worksheet and the original cell contains a pointer to a formula, that pointer is stored into the next available entry in the table of formulas that was allocated above. Additionally, the count of formulas detected so far is incremented, and the index to that formula (e.g., position of that formula within the formula table) is stored into the SDF cell. If the formula is a dynamic array, the current row array index is set to this dynamic array index. Finally, if the cell exists in the original worksheet and if the original cell contained anything other than a dynamic array or empty value, the current row array index is cleared. The current cell is an obstruction that will prevent that array from spilling further right. In contrast, if the cell exists only in the SDF and not in the original worksheet, the cell value is set to empty.

If the current cell has no value, the spill area for the current cell is computed based on the values in the "left," "above," and "above left" cells as well as the current row array index. The algorithm for performing this computation is described in further detail below. The computed value is then stored into the cell as the cell's spill area.

The iterators are advanced. If the current cell is not within the original worksheet, the iteration over the original worksheet are not advanced but all the pointers into the SDF cell table—the "current," "left," "above," and "above left" pointers—are advanced. If the iteration advances to a new row, the current row array index is cleared. Finally, if the iteration is not complete, the iteration continues. Once the iteration is finished, the initialization of the SDF cell table is complete.

The operations to determine the spill area of a current cell is next described. Initially, if either the "left" or "above" cells contains a dynamic array, the spill area analyzer 116 checks if a spill area has been created yet for that dynamic array. If not, the spill area analyzer 116 creates a spill area for it, and increments the count of spill areas. The plex of spill areas and the map from dynamic array sets to spill area indices are updated appropriately. For the purposes of the remainder of the operations, assume that the cell contains the newly created spill area.

The spill area analyzer 116 examines the "left" and "above" cells. If neither cell contains a spill area, this indicates that there are no arrays either from the left or from above that can spill into the current cell. The spill area analyzer 116 does not store any spill area into the current cell and exits the operations.

However, if the "above" cell does not contain a spill area, all dynamic arrays from above or above left are blocked by an obstruction. Therefore, the only dynamic array that can spill into the current cell is the current row array. The spill area analyzer 116 checks if the current row array index is set. If so, the spill area analyzer 116 looks up the spill area that corresponds to just that dynamic array, and stores it into the current cell and ends the operations. Otherwise, the spill area analyzer 116 does not store any spill area into the current cell and ends the operations.

Alternatively, if the "left" cell does not contain a spill area, any dynamic array from the left is blocked. The only array that can spill into the current cell must come from directly above. The spill area analyzer 116 looks up the spill area from the "above" cell, and reads the dynamic arrays within the spill area. For each dynamic array, the spill area analyzer 116 checks if it is directly above the current cell. There will be at most one such array. If there is such an array, the spill area analyzer looks up the spill area that corresponds to just that dynamic array, and stores it into the current cell and exits the operations. Otherwise, the spill area analyzer 116 does not store any spill area into the current cell and exits the operations.

In a final case where both the "above" and "left" cells contain spill areas, the spill area analyzer 116 compares the "above" cell with the "above left" cell. If these cells contain the same spill area, that implies that the same dynamic arrays can spill into the current cell as can spill into the cell to the left. The spill area analyzer 116 reads the "left" cell, stores the same spill area into the current cell, and exits the operations.

Alternatively, the spill area analyzer 116 looks up the spill area corresponding to the "above" cell, and reads all the dynamic arrays it contains. Likewise, the spill area analyzer 116 looks up the spill area corresponding to the "left" cell, and reads the dynamic arrays it contains. A dynamic array that can spill into the "above" cell may be blocked from spilling into the current cell by an obstruction on the current row. If a dynamic array is directly above the current cell, then it can spill into the current cell. If a dynamic array is somewhere above and to the left and it is able to spill into the current cell, that implies that it can also spill into the "left" cell. Therefore, the spill area analyzer 116 computes the set of dynamic arrays from the "above" spill area where the dynamic array is either (a) directly above the current cell or (b) contained in the "left" spill area. The set of dynamic arrays from the "above" spill area is added to that set of the current row array. The spill area analyzer 116 then looks up the resulting set of dynamic arrays in the map from dynamic array sets to spill areas. If there is no entry in that map, the spill area analyzer 116 creates a new spill area containing the set of dynamic arrays, stores it into the plex of dynamic arrays, and updates the map. The spill area analyzer 116 then stores the index to the spill area (either the existing spill area that was successfully found in the map, or the spill area that is newly created) into the current cell.

Figure 4:
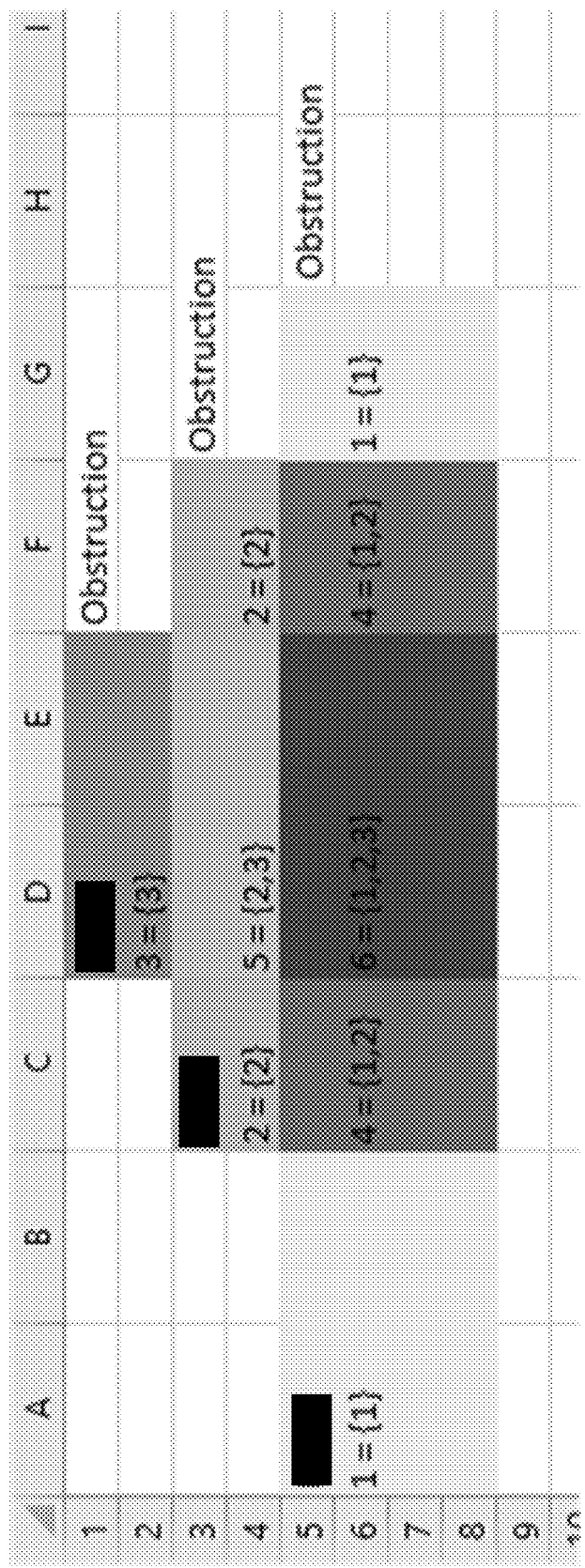
FIG. 4 is an example worksheet used to illustrate determining spill areas, according to some example embodiments.

To provide better understanding of how the spill area analyzer 116 determines the spill area, consider an example case as shown in FIG. 4. Dynamic arrays (DA) have a fixed home cell or upper left corner. A dynamic array can spill right and down, but not left or up. A dynamic array can only spill into a rectangular area. The fact that a dynamic array can only spill down and right means that when the spill area analyzer 116 wants to figure out which dynamic arrays can spill into a particular empty cell, the spill area analyzer 116 only needs to look up and left from that cell. If the dynamic array spills into a particular empty cell, the home cell of that dynamic array is either (1) directly to the left of the cell; (2) directly above the cell; or (3) both above and to the left of the cell.

Considering the first case, the dynamic array directly to the left can spill into a cell even if it cannot spill into the cell above. There can only be a single dynamic array directly to the left that can spill into the cell being considered. If there are multiple dynamic arrays whose home cells are on the same row, each dynamic array to the right will serve as an obstruction that blocks the spilling of the next dynamic array to the left.

Considering the second and third cases, if the dynamic array can spill into a cell, and the dynamic array is either directly above or above and to the left of the cell, that implies that the dynamic array can also spill into the cell directly above the cell the spill area analyzer 116 is considering. In other words, if an obstruction blocks such a dynamic array (e.g., a dynamic array whose home cell is at least one row above the current cell) from being able to spill into the cell immediately above, then the same obstruction must block the dynamic array from spilling into the cell being considered.

Therefore, the set of dynamic arrays that can spill into a particular empty cell is the sum of the set of dynamic arrays that can spill into the cell directly above plus the single dynamic array that can spill in from the left. Thus, the dynamic array spill areas can be determined by iterating over the cell table in row major order (e.g., left to right and then top to bottom) and combining information from the cells above and information about the most recently encountered (i.e., rightmost) dynamic array on the current row.

For each cell, the spill area analyzer 116 computes the spill area it belongs to as efficiently as possible. One optimization is to consider whether the cell should have the same spill area as the cell to the left. This will be true if the set of dynamic arrays spilling in from above and from the left are the same for the current cell as for the cell to the left. For example, consider cell E5 in FIG. 4. Since there is no obstruction in cell D5, the spill area analyzer 116 knows that if there is a dynamic array that can spill into D5 directly from the left, then that same dynamic array will likewise be able to spill into E5. Similarly, if the spill area of cell E4 is the same as the spill area of D4, then the set of dynamic arrays that can spill into E5 from above is the same as the set that can spill into D5 from above. Therefore, the overall set of dynamic arrays that can spill into E5 is the same as into D5. Thus, the spill area analyzer 116 determines E5 is in the same spill area as D5. As shown in FIG. 4, each spill area is labeled with an index number and indicates which dynamic array(s) can spill into it.

Referring back to FIG. 1, the data storage 108 is a storage device configured to store information associated with the creation and invocation of SDFs. Thus, the data storage 108 can store SDF cell tables, formula indices or tables, and spill area indices or tables that are generated at SDF creation time. The data storage 108 then provides access to these tables, during invocation time, to the invocation engine 106, which uses the data in the tables to determine the results. While the data storage 108 is shown to be embodied within the computing device 100, alternative embodiments can locate the data storage 108 elsewhere and the data storage 108 be communicatively coupled to the computing device 100. Furthermore, while only a single data storage 108 is shown in FIG. 1, more than one data storage 108 may be provided (e.g., a separate data storage for each type of table being stored).

The invocation engine 106 is configured to manage operations during invocation of SDFs. As such, the invocation engine 106 comprises a result module 118, an order module 120, a spill area evaluator 122, and a dependency module 124. In various embodiments, the result module 118 works with the other components of the invocation engine 106 to determine the result for each invocation of a SDF and to cause display of the result in one or more cells of the worksheet. Initially, the result module 118 receives, via the device interface 102, an indication of invocation of the SDF including an identity of the SDF. The result module 118 may then trigger or work with one or more of the other components of the invocation engine 106 to derive the result.

The order module 120 is configured to determine an order in which to perform formulas for a SDF invocation. The SDF invocation can hold a calculation chain, which is simply an array of indices to formulas, using the same formula indices established in the formula table when the SDF was created. Each formula may require a result of another formula in order to calculate itself. The calculation chain defines the order. If a dependency is discovered, the order is changed by the order module 120 such that anything that a particular formula depends on is already calculated. If the calculation chain needs to be reordered, a stack of "in progress" formulas is created, and a second "new" calculation chain that records the order in which the formulas are calculated is created. After iterating the calculation chain, the new calculation chain becomes the official calculation chain.

Figure 5A:
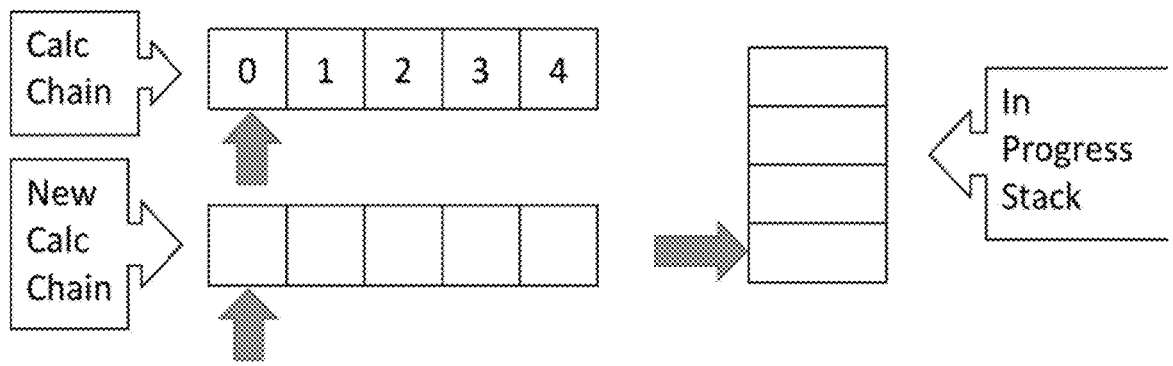
FIGS. 5A-5F are diagrams illustrating determination of a new calculation chain, according to some example embodiments.
Figure 5B:
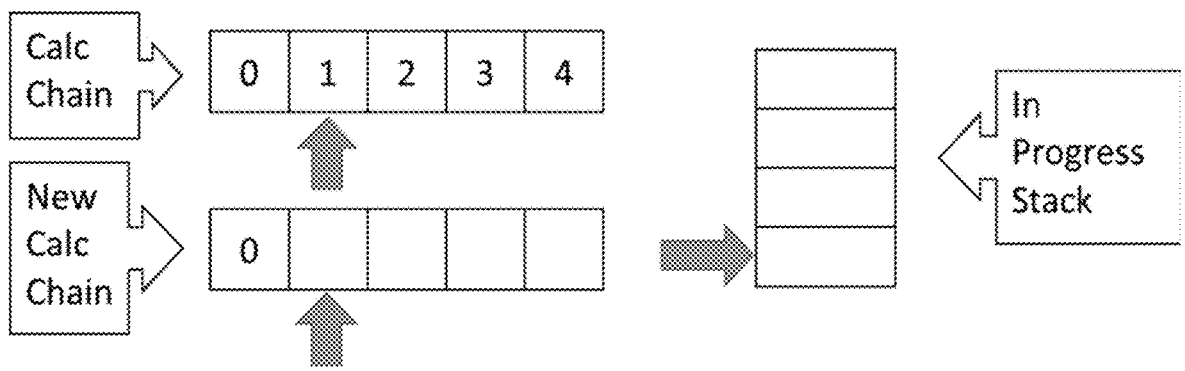

For example, suppose an SDF involves five formulas, and the initial calculation chain is as shown in FIG. 5A. The current formula is formula 0. The order module 120 attempts to calculate formula 0. Here, formula 0 calculates successfully. The order module 120 places formula 0 in the new calculation chain and moves on to the next formula, as shown in FIG. 5B.

Figure 5C:
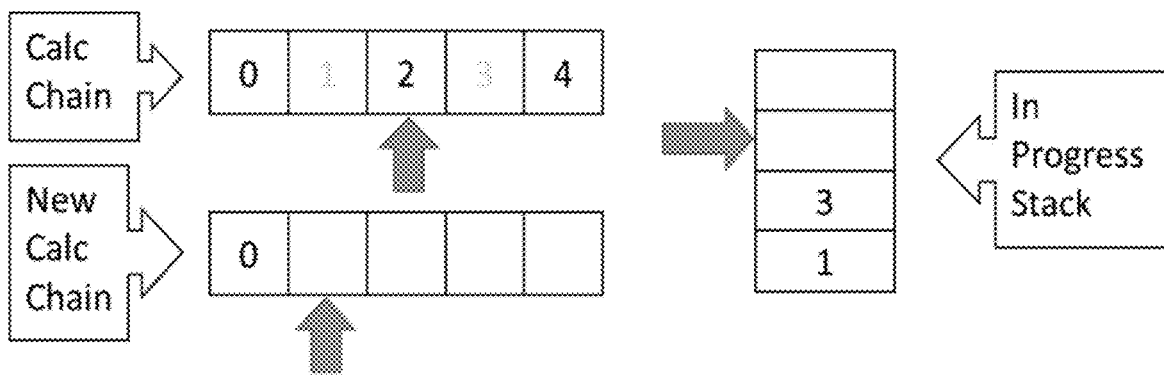

The current formula is now formula 1. The order module 120 tries to calculate formula 1, but formula 1 depends on formula 3. The order module 120 pushes formula 1 onto the "in progress" stack, and then likewise pushes formula 3 onto the "in progress" stack as shown in FIG. 5C. The order module 120 sets a flag on the results for formulas 1 and 3 that indicate that they have been removed from the normal calculation chain, and sets another flag indicating that formulas 1 and 3 are currently in progress.

Figure 5D:
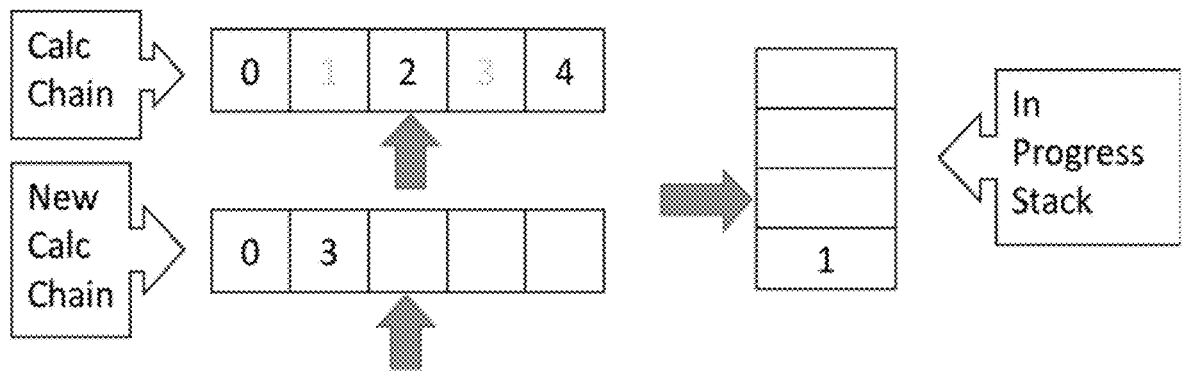

When the order module 120 looks for the next formula to calculate, the order module 120 first checks the "in progress" stack. If there are any formulas in that stack, then the order module 120 must calculate those formulas before calculating anything on the normal calculation chain. As such, the order module 120 takes formula 3 from the "in progress" stack and calculates it successfully. The order module 120 places formula 3 into the new calculation chain, as shown in FIG. 5D.

Figure 5E:
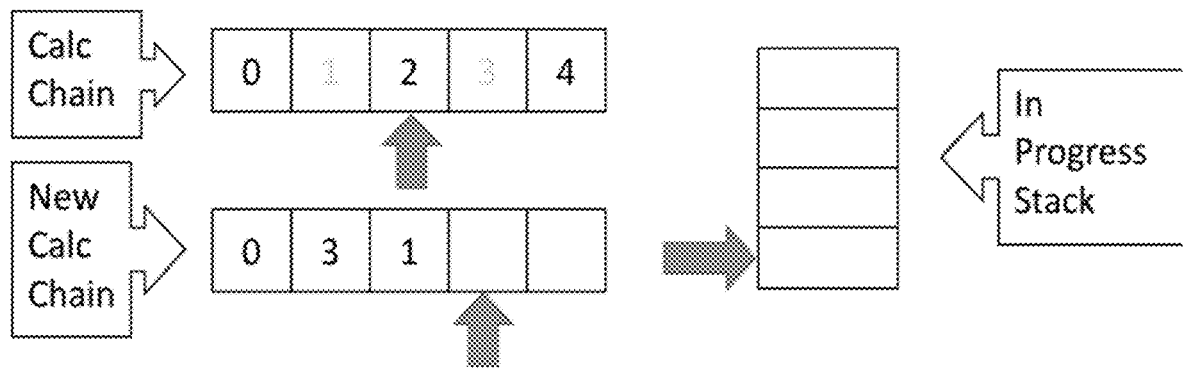

Next, the order module 120 first looks at the "in progress" stack and now detects formula 1. The order module 120 takes formula 1 from the "in progress" stack and calculates it successfully. The order module 120 places formula 1 into the new calculation chain, as shown in FIG. 5E.

Figure 5F:
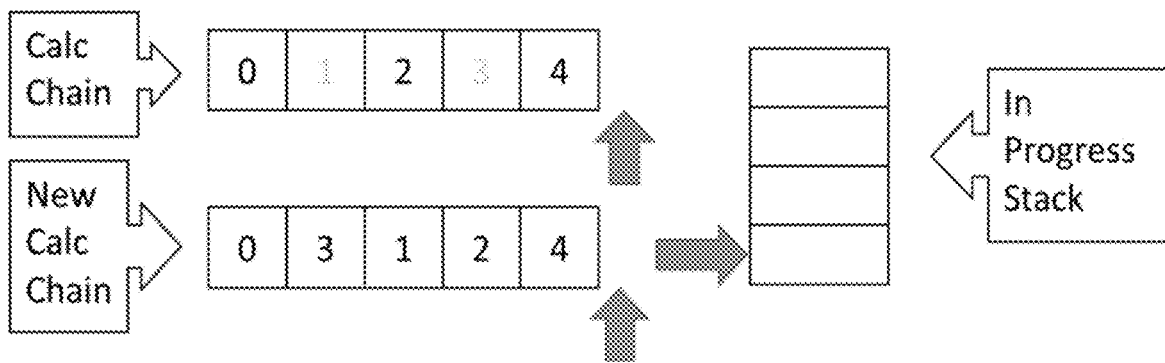

Formulas 2 and 4 calculate successfully, and the order module 120 is done with determining the order as shown in FIG. 5F. Note that the order module 120 avoids calculating formula 3 a second time because it was marked as being removed from the normal chain.

Finally, the order module 120 copies the "new" calculation chain onto the regular calculation chain. This is done in case a second calculation pass is needed (e.g., due to a dynamic array resize). In some embodiments, the newly reordered calculation chain is stored back into the SDF and used for subsequent invocations.

Currently, the calculation chain is created from scratch at the start of an SDF invocation. It is simply filled out in increasing order of formula indices, with the exception that the result formula is placed first on the calculation chain. The invocation engine 106 exits SDF evaluation the moment the result formula calculates successfully (with a caveat regarding array resizes to be covered later). Therefore, the only formulas that are calculated are the ones required to produce the final result.

The spill area evaluator 122 determines whether an empty cell that is referenced by the invocation of the SDF has been spilled into by a dynamic array and assists the result module 122 in determining a cell's value. Only a single dynamic array can spill into a given spill area at a time, even if it does not cover the entire spill area. During SDF invocation, the spill area evaluator 122 allocates an array of SdfSpills, one for each spill area. The SdfSpill keeps track of which array, if any, is currently spilled into it. The SdfSpill is also used to set an evaluation-time dependency on a spill area, as will be discussed in more detail below. When accessing a cell value, the spill area evaluator 122 determines what spill area the cell is associated with. A look up (e.g., of the spill area table) is then performed for that spill area to determine which dynamic array(s) spills into that area. The spill area evaluator 122 goes to the SdfSpill to see if one of those arrays, if any, spilled into that area. If an array is indeed spilled into the area, the spill area evaluator 122 checks the array's bounds (e.g., stored in SdfResult), and gets the appropriate entry for the given cell.

Figure 6A:
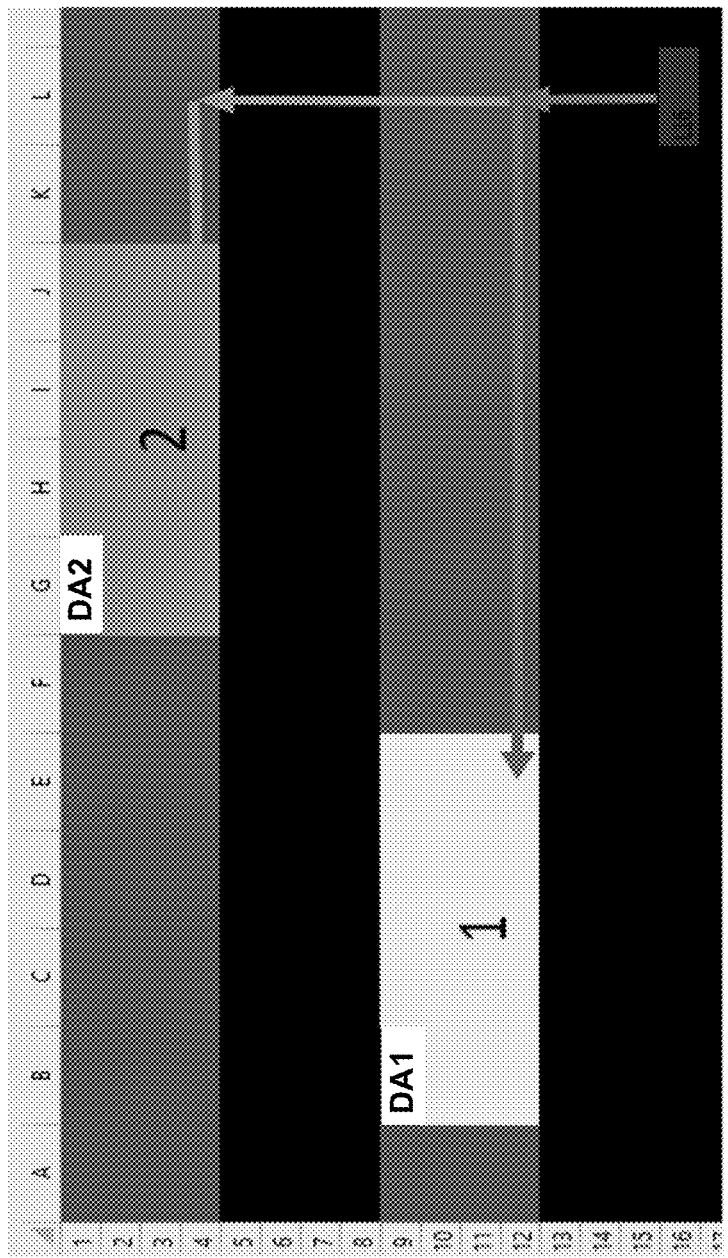
FIG. 6A is an example worksheet illustrating how to search for a dynamic array that may have spilled into a spill area, according to some example embodiments.

When a formula references an unpopulated cell, the spill area evaluator 122 needs to efficiently search for a dynamic array that could possibly spill into that unpopulated cell. Referring to the example shown in FIG. 6A, there are 2 populated cellblocks: one for rows 1-4 and one for rows 9-12. The cellblock for rows 1-4 has a span of populated columns from G-J, and the cellblock for rows 9-12 has a span of populated columns from B-E. Hence, these spans have not been normalized, so this example is showing the case when the spans are not normalized. A formula references cell L16, which is in an unpopulated cellblock.

The spill area evaluator 122 first searches upward for a populated cell block. The phrasing "search upward" is a bit deceiving, as the spill area evaluator 122 is not literally searching within grid positions. Instead, there is an array of cellblock pointers, indexed by cell block number. The size of cellblocks is fixed (e.g., 4 rows in debug builds, 16 rows in ship/production builds). As such, the spill area evaluator 122 takes the original zero-indexed row number of the reference (e.g., 15, one less than 16 because the 16 within "L16" is a 1-based index), and divides it by the fixed cellblock size (e.g., 4), to find the index of the cellblock that holds the reference (e.g., 3). The spill area evaluator 122 looks into the array of cellblock pointers, and see that the entry at position 3 is null. Then, the spill area evaluator 122 iterates toward lower indices in that array until it hits an entry with a non-null cellblock pointer, which in this case is at position 2 representing rows 9-12.

Once the spill area evaluator 122 finds a populated cell block, the spill area evaluator 122 searches leftward to find a populated cell. Again, the phrasing "search leftward" is deceiving, as the spill area evaluator 122 is not literally searching within grid positions. In example embodiments, the grid is divided into 16 spans of columns, each span responsible for a set of 1024 columns. Thus, the first span is responsible for column A through AMJ. Each span has a particular populated range, and the populated range may be different for each cellblock.

For the cellblock representing rows 9-12, the first span has a populated range including columns B through E. As such, when "searching leftward," the spill area evaluator 122 takes the original column L, figures out which span it belongs to (e.g., the first span, which covers columns A-AMJ), checks the populated range of that span for the cellblock the spill area evaluator 122 is currently looking at (e.g., the one for rows 9-12). If the right edge of the populated range is less than (i.e., to the left of) the original column, then the spill area evaluator 122 uses the right edge. If the original column is within the populated range, then the spill area evaluator 122 uses the original column. If the original column is less than (i.e., to the left of) the left edge of the populated range, then the spill area evaluator 122 looks at the next lower (i.e., leftward) span.

In this case, the original column L is greater than the right edge of the populated area, so the spill area evaluator 122 uses that right edge (column E). The spill area evaluator 122 arrives at populated cell E12, and see that it is part of spill area 1. The spill area evaluator 122 checks which dynamic array (if any) has spilled into spill area 1, and then check if that array has spilled all the way into L16. If it has, then the operation is complete. However, if it has not spilled into L16, then unfortunately, the spill area evaluator 122 is not done searching. There's still the possibility of a dynamic array from an earlier cellblock (e.g., DA2 in this case) spilling into L16. So, without normalizing the spans, the spill area evaluator 122 needs to repeatedly search upward and leftward. This is not efficient.

Figure 6B:
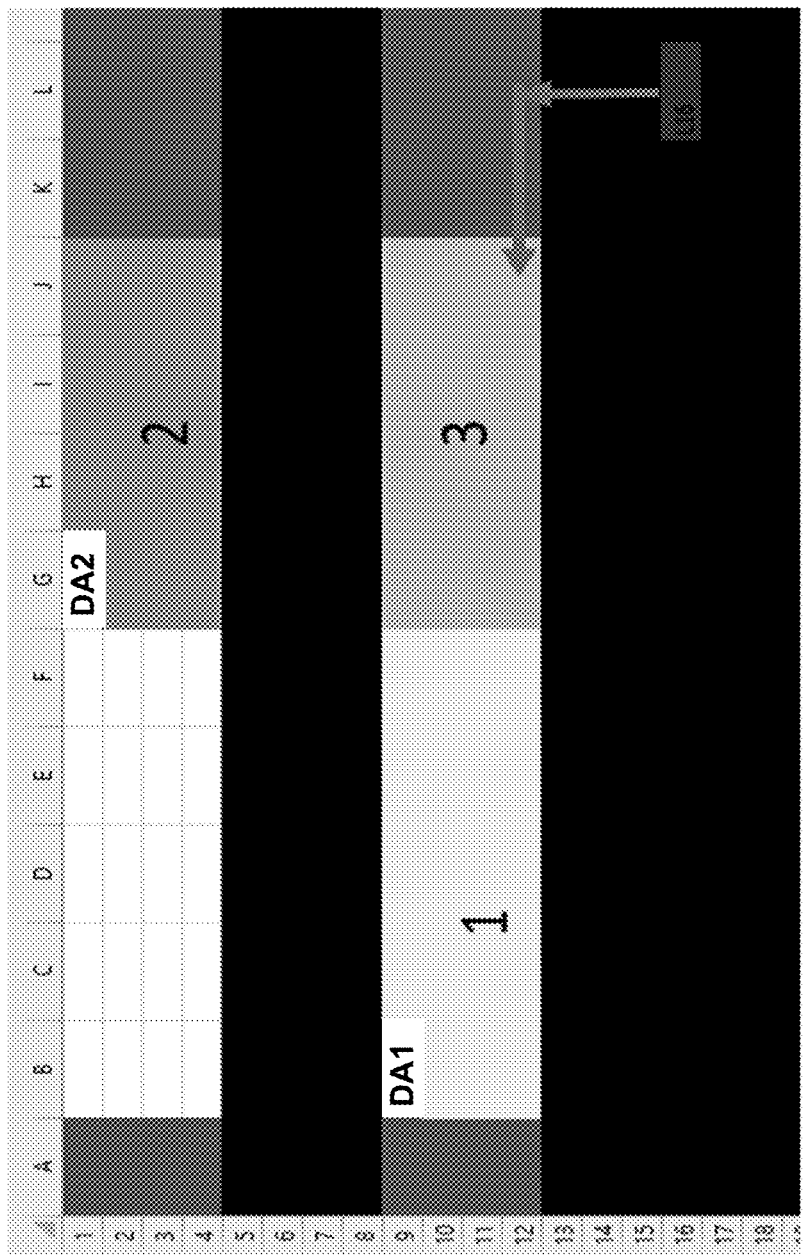
FIG. 6B is an example worksheet illustrating how to search for a dynamic array that may have spilled into a spill area using normalization, according to some example embodiments.

Therefore, example embodiments normalize the spans. The same case with normalized spans is shown in FIG. 6B. In this example, the spill area evaluator 122 "searches upward" for the next populated cellblock, and then "searches leftward" for a populated column, and arrive at J12. The initial processing of the cell table has figured out that J12 is within spill area 3, which can be spilled into by either dynamic array 1 or dynamic array 2. As such, the spill area evaluator 122 looks up spill area 3, determines which array (if any) has spilled into it, and then determines if that array has spilled into L16. There is no need to continue searching upward in this embodiment. If there is a dynamic array in an earlier cell block that can possibly spill into L16, that implies that it must also spill into spill area 3, which has already been checked. Thus, normalizing the spans provides for more efficient processing at invocation time.

Figure 7:
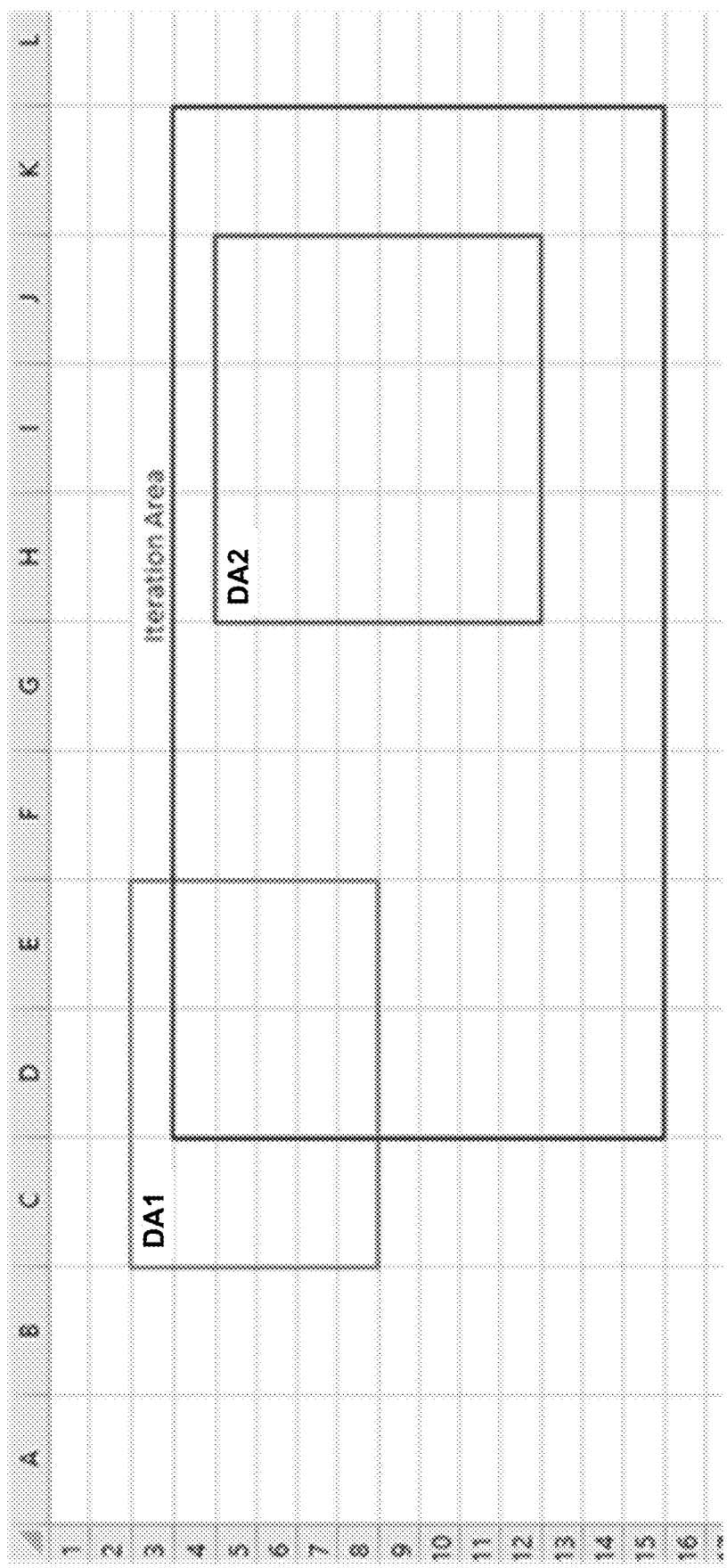
FIG. 7 is an example worksheet used for illustrating efficiently obtaining cell values during invocation of a SDF, according to some example embodiments.

For random, single-cell references into unpopulated areas, it may be fine to pay the cost of searching for a populated cell. For iterations over an area, the result module 118 does not want to grab each individual cell value separately, because it is computationally expensive. Referring now to FIG. 7, some of the information of how to get a value for E4, for example, is common with how to get information for D4. Since, the cell table is laid out in memory with E4 right after D4, the result module 118 just needs to increment a cell pointer by 1 to go from D4 to E4. In contrast, if there is no information at all and the result module 118 needs to look up the cell value of E4, the result module 118 will have to find the cellblock it belongs to, within the cellblock, check if the row is populated, check whether it is in a populated span, and so forth.

Thus, when doing an iteration over an area, the result module 118 may set up an iterator class that caches as much of this intermediate information as possible to make the overall iteration fast. It will cache the current cell block that the result module 118 is on, the point where the result module 118 gets to the end of the current span, and so forth.

In some situations, the result module 118 needs to iterate over an area that may contain multiple dynamic arrays. Here when performing the iteration, part of the time the result module 118 is iterating over a cell table (F4-K4) and part of the time iterating (for D4-D5) over result values for dynamic array 1.

The SDF cell table is shared by the invocations, while the dynamic array results are different for different invocations. The structure that stores the results for dynamic array 1 is not the same structure that stores just values from the SDF cell table. Thus, the result module 118 (operating as an iterator mechanism) can simultaneously iterate over both structures. The result module 118 starts iterating over dynamic array 1 and when it finds that it is at the end of dynamic array 1, it switches over to iterating over the SDF cell table. Once finished with the current row, the result module 118 resumes iterating over dynamic array 1, and so forth.

Thus, the result module 118 simultaneously stores information about its position within multiple components (e.g., many dynamic arrays and also the SDF cell table itself). The way this is done is to set up a circular queue of actual array spill areas (not potential spill areas) that intersect the iteration area. In the example of FIG. 7, the queue starts out with a single entry for dynamic array 1. The entry contains the intersection of the spill area with the iteration area (D4:E8), as well as the next row available for iteration (row 4 to start). The result module 118 maintains a "current" pointer into this queue (referred to as "spill queue"). The "current" pointer always advances forward, but as the queue is circular, when the "current" pointer advances past the end, it returns to the beginning.

Each time the results module 118 needs to get the next available block of cells to iterate over, the results module 118 examines the current entry in the spill queue. If it contains a block that starts at the iteration's current location, then the results module 118 uses a block of cells from the array's result. The results module 118 also may increment the next available row in the spill queue entry, and advance to the next spill queue entry.

So, in the example shown in FIG. 7, the iteration's current location is D4 and that is the start of a next available block in the spill queue entry. The result module 118 uses a block of cells from the array result, and updates the next available row in the spill queue entry to 5. The results module 118 advances to the next spill queue entry, which will be the same entry, because the queue is circular and contains only one entry.

Once the result module 118 finishes iterating over D4:E4, the result module 118 is at F4 and needs to get the next block of available cells. The current spill queue entry has a block that starts at D5, so that is not used. Instead, the results module 118 uses cells F4:K4 from the cell table. Once again, the result module 118 gets the cells for D5:E5 from the spill queue entry. The results module 118 advances past that and get the cells for F5:K5 from the cell table. When the results module 118 hits H5, the cell table indicates that it is a formula cell. As such, the results module 118 looks in the table of formulas and sees that it is a dynamic array formula (i.e., dynamic array 2) and adds dynamic array 2 into the circular queue. Skipping ahead, after the result module 118 gets the cells for D8:E8 from the spill queue entry for MA1, the results module 118 sees that there are no more rows available from that entry and removes the entry from the circular queue.

Expanding on the example of FIG. 7, there are times when the cell table is sparse, resulting in the result module 118 iterating over an area that intersects partly populated cells and partly unpopulated cells. The result module 118 divides the width of the sheet into 16 regions (to account for values in columns that are far apart). Each of those regions is responsible for approximately 1024 columns, for example, and each of those regions has a populated span. So there can be one span of columns and a second span of columns to the right. In order to do an iteration over this area, the result module 118 will have to do a combination of looking up the values for a cell in an unpopulated area combined with the spill queue concept discussed above.

Figure 8:
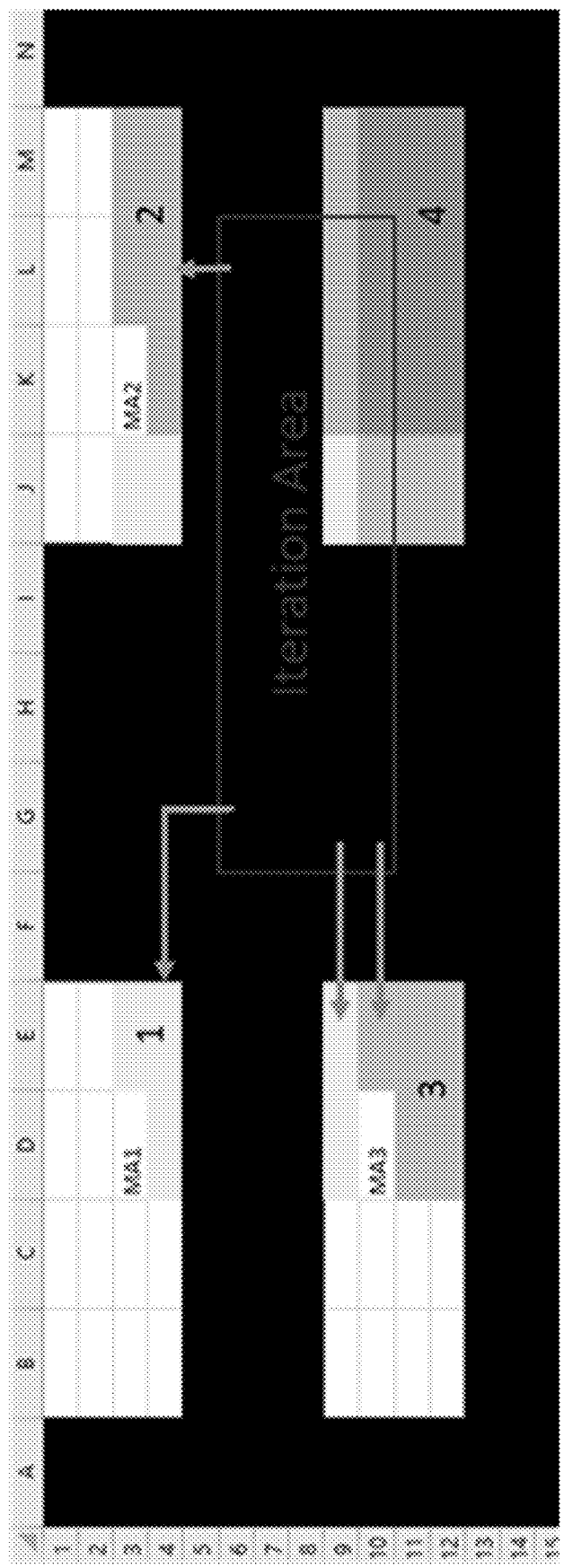
FIG. 8 is an example worksheet used for illustrating efficiently obtaining cell values from a sparse cell table, according to some example embodiments.

Referring now to FIG. 8, an example cell table is shown where blacked out cells are empty. An iteration is started over an area starting at cell G6. G6 is withing an unpopulated cell block, which implies that there are no populated cells anywhere within the cell block and therefore there is no need to look left for a potential dynamic array spill area. Therefore, the result module 118 looks up to find the nearest populated row and then looks left within that populated row to find a populated span. If that is a spill area associated with a dynamic array, the result module 118 looks up what dynamic array has spilled into that area. The result module 118 then checks if that dynamic array spilled into the actual cell that the result module 118 wants to iterate over (G6). If the dynamic array did spill over into the cell, the result module 118 adds that dynamic array into the circular queue and proceeds with the iteration as normal.

Referring back to FIG. 1, the dependency module 124 is configured to manage dynamic array dependencies. If a formula references into an empty cell, that formula can calculate successfully. Later, however, a dynamic array can spill into that cell, so that formula is no longer valid. The dependency module 124 provides a way to detect this. Thus, within an SDF invocation, whenever a cell is referred to that is currently empty but in a spill area (e.g., as indicated by the spill table), the dependency module 124 takes a dependency on that spill area. For each spill area, there will be a collection of formulas that the dependency module 124 has declared to be dependent upon that spill area.

Whenever a formula refers to a spill area and sees that it is currently an empty cell, it knows it is in a situation where it has gotten a value right now, but that a dynamic array may spill into it later. As such, the dependency module 124 adds the formula to the collection of formulas that depends on that spill area. Then later if a dynamic array spills into that spill area, the dependency module 124 iterates through all of the formulas that have added themselves as dependencies of that spill area and dirties all those formulas. Thus, the dependency mechanism created by the dependency module 124 is built on-the-fly while evaluating the formula within a specific SDF invocation. Note that, if a formula references another formula which itself has a dependency on a spill area, the dependency module 124 can create a dependency on that new formula on the spill area. In this way, second-level dependencies on spill areas get dirtied appropriately.

In example embodiments, the computing device 100 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that computing device 100 or machine. For example, a special-purpose computer system able to implement any one or more of the methodologies described herein is discussed below with respect to FIG. 12, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 9:
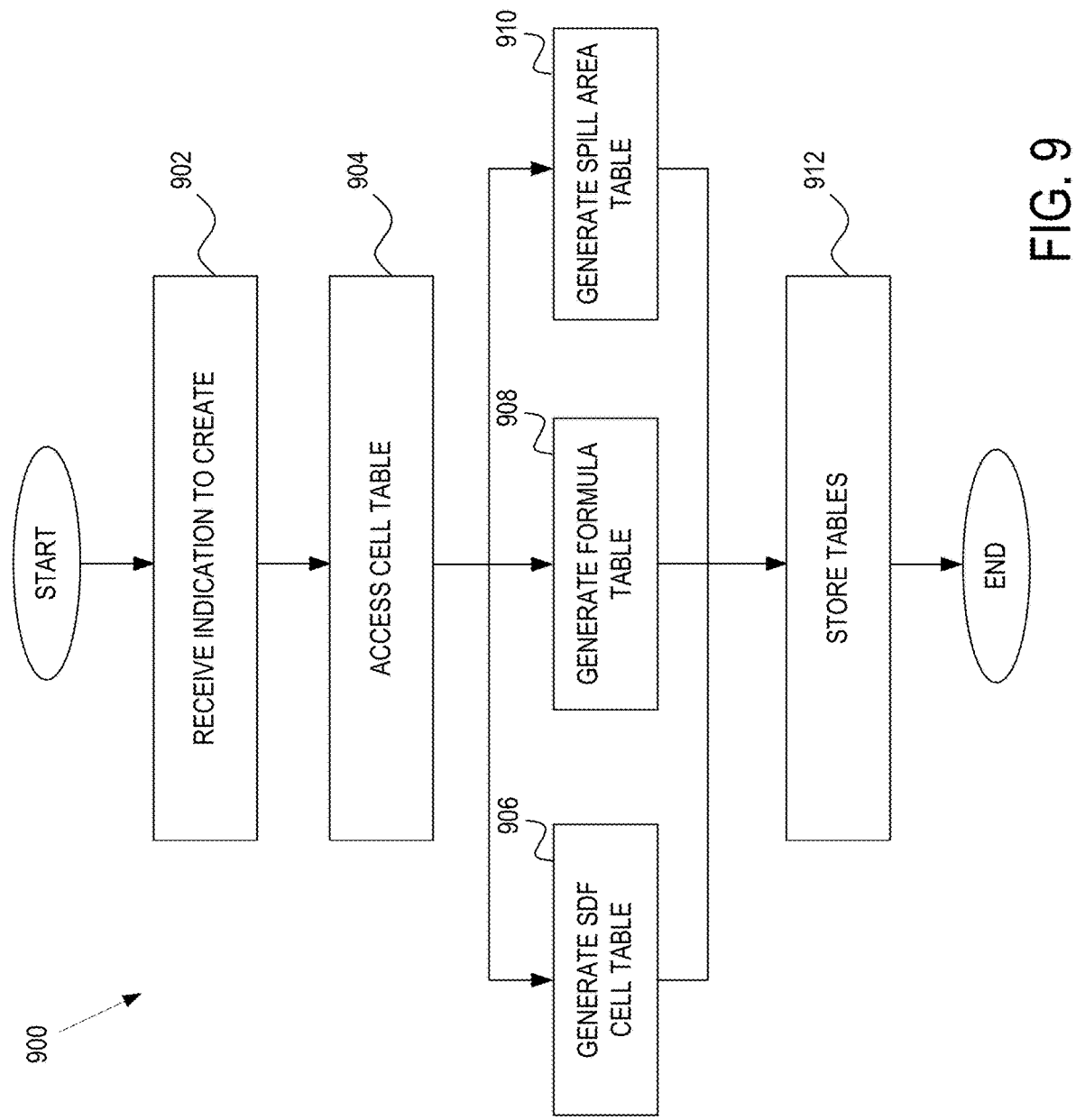
FIG. 9 is a flowchart illustrating a method for creating the SDF and associated tables, according to some example embodiments.

FIG. 9 is a flowchart illustrating a method 900 for creating an SDF and associated sharable tables, according to some example embodiments. Operations in the method 900 may be performed by the SDF creation engine 104 of the computing device 100 using components described above with respect to FIG. 1. Accordingly, the method 900 is described by way of example with reference to the SDF creation engine 104. However, it shall be appreciated that at least some of the operations of the method 900 may be deployed on various other hardware configurations or be performed by similar components residing elsewhere. Therefore, the method 900 is not intended to be limited to the SDF creation engine 104.

In operation 902, request to create a SDF is received by the SDF generator 110 via the device interface 102. The request includes an indication of an area or moat of the SDF. The moat comprises a rectangular area on an original worksheet/spreadsheet that contains all the formulas and data that will make up the SDF. The request also includes an indication of which cell(s) are the inputs and which cell(s) are the output.

In operation 904, the SDF creation engine 104 accesses the source cell table associated with the SDF being created. The source cell table will include the cells that are the inputs and output for the SDF.

Operations 906-910 can occur substantially simultaneously. In operation 906, the cell table generator 112 generates the SDF cell table. The SDF cell table comprises the maximum amount of information that can be shared between all formula invocations and comprises a "shallow clone" of the moat's cell table. In example embodiments, the cell table generator 112 "clones" the moat's cell table but replaces pointers to formula classes with an index that is looked up in a formula table.

In operation 908, the formula indexer 114 generates the formula table. In example embodiments, the formula indexer 114 indexes all the formulas associated with the SDF so that the order in which the formulas are evaluated are stored separate from the formula classes themselves. As the SDF is being created, each new formula that is encountered is assigned a different index number and is indexed in the formula table by that index number. The formula index number is then stored in cells of the SDF cell table that use that formula.

In operation 910, the spill area analyzer 116 generates a spill area table. The spill area table indicates labels or indices of all potential spill areas (e.g., area of cells) where each dynamic array may automatically spill into. The process for generating the spill area table was discussed in more detail in connection with FIG. 4 above.

In operation 912, the SDF cell table, formula table, and spill area table are stored to the data storage 108 (e.g., by their respective generator, indexer, or analyzer). The stored tables are generated and stored at SDF creation time and subsequently shared at SDF invocation time between all invocations.

Figure 10:
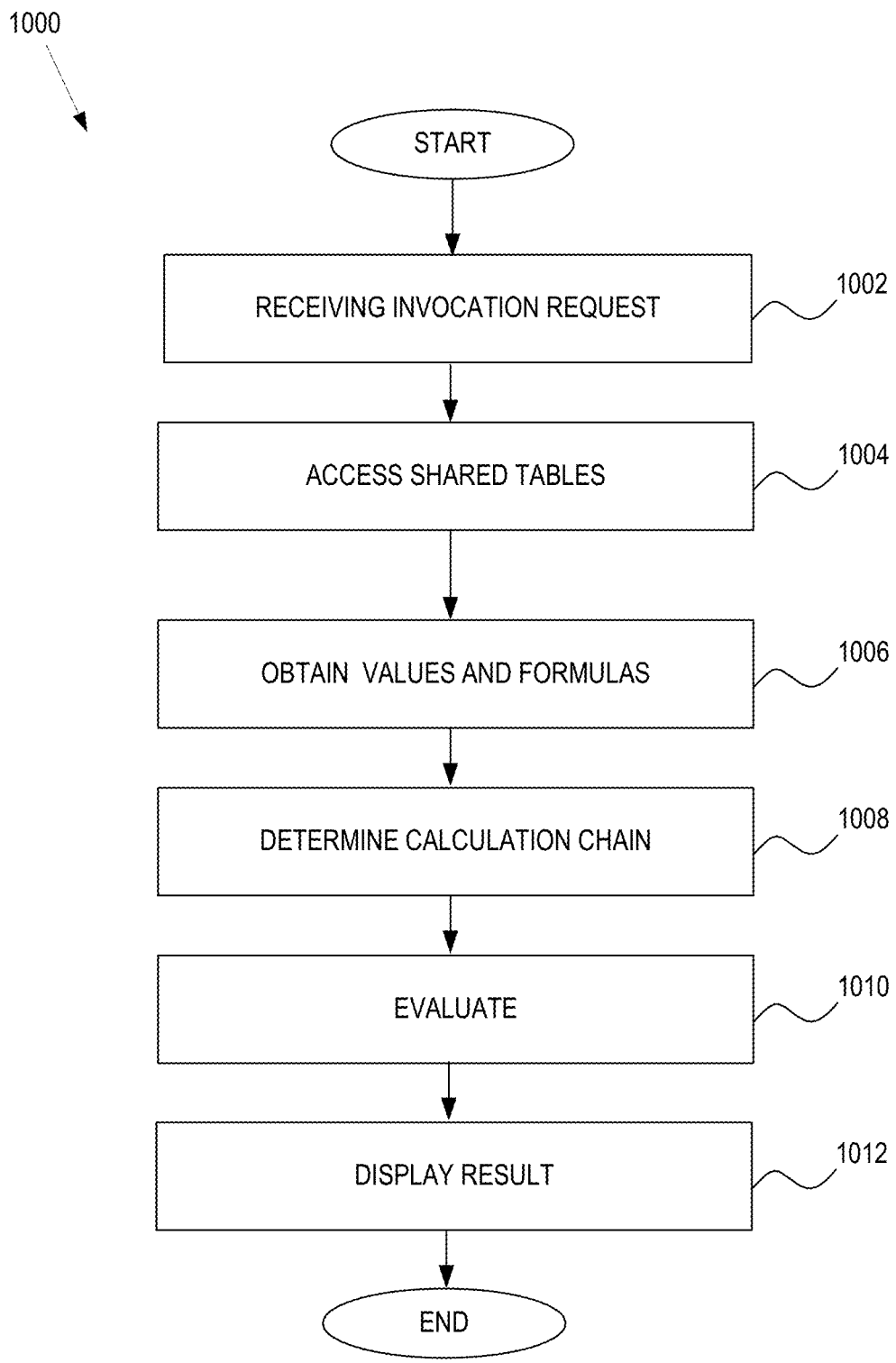
FIG. 10 is a flowchart illustrating a method for determining results at invocation time, according to some example embodiments.

FIG. 10 is a flowchart illustrating a method 1000 for determining results at invocation time, according to some example embodiments. Operations in the method 1000 may be performed by the invocation engine 106 of the computing device 100 using components described above with respect to FIG. 1. Accordingly, the method 1000 is described by way of example with reference to the invocation engine 106. However, it shall be appreciated that at least some of the operations of the method 1000 may be deployed on various other hardware configurations or be performed by similar components residing elsewhere. Therefore, the method 1000 is not intended to be limited to the invocation engine 106.

Additionally, the method 1000 can be performed in a different order of operations in alternative embodiments.

In operation 1002, the invocation engine 106, via the device interface 102, receives an invocation request. The invocation request will identify the SDF being invoked. In response, in operation 1004, the invocation engine 106 accesses the shared tables that are stored in the data storage 108.

In operation 1006, the result module 118 obtains values from the various cells in the SDF cell table that are needed to perform the evaluation for the instance of the SDF invocation. The result module 118 also obtains, using a formula index and the formula table, the formulas that are needed for the evaluations. In some embodiments, accessing the values includes determining, by the spill area evaluator 122, whether a cell is within a spill area of a dynamic array and determining whether the dynamic array has spilled into that cell.

In operation 1008, the order module 120 determines a calculation chain for evaluating an instance of the SDF invocation. The calculation chain defines an order in which to evaluate a set of formulas. If a dependency is discovered, the order is changed by the order module 120 such that anything that a particular formula depends on is already calculated. If the calculation chain needs to be reordered, a stack of "in progress" formulas is created, and a second "new" calculation chain that records the order in which the formulas are calculated is created. After iterating the calculation chain, the new calculation chain becomes the official calculation chain. More details regarding the ordering of the formulas was discussed above in connection with FIG. 5A-5F.

In operation 1010, the result module 118 evaluates the SDF using the obtained values and formulas (in the correct order). The result is then displayed in operation 1012.

Figure 11:
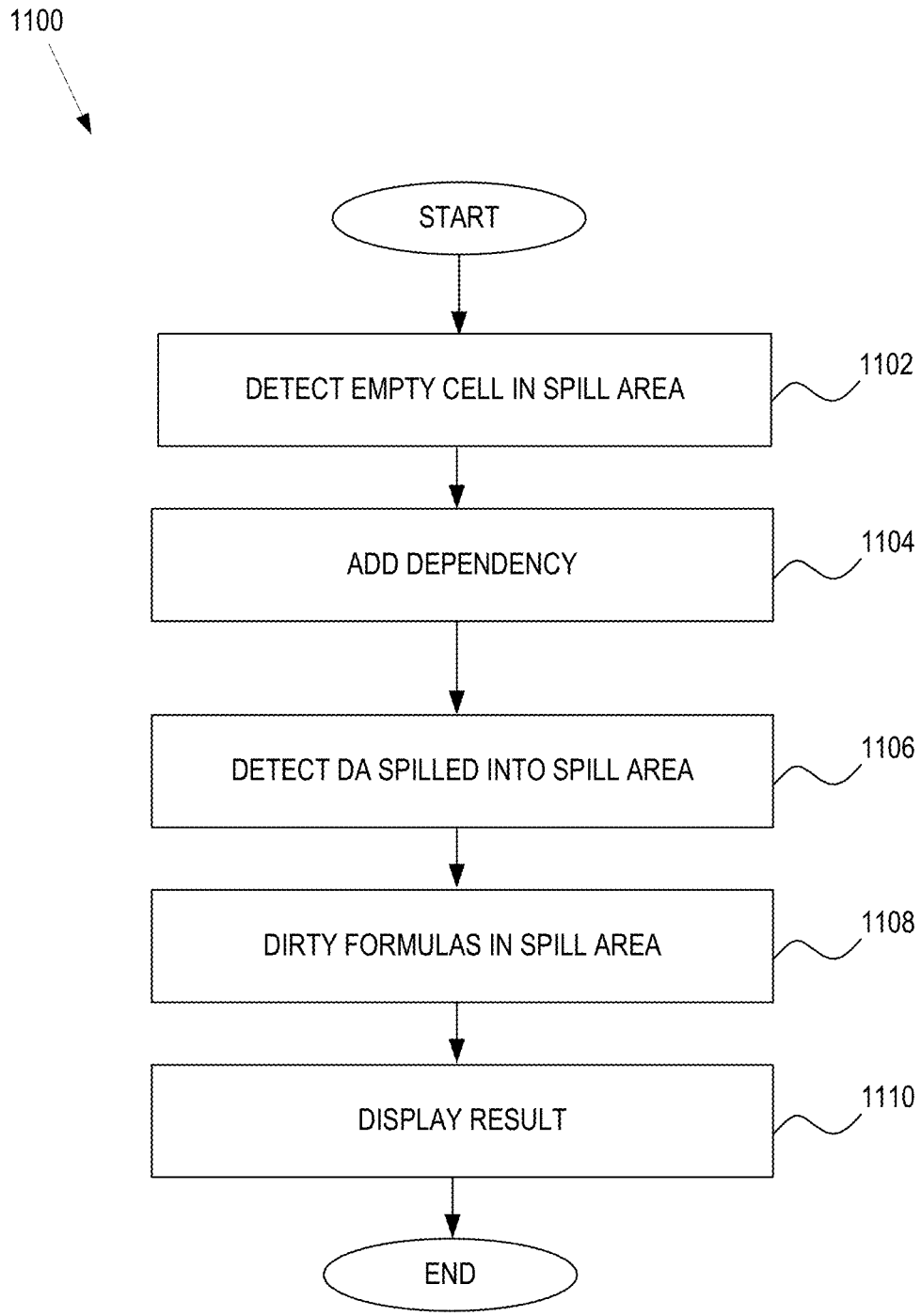
FIG. 11 is a flowchart illustrating a method for using formula dependencies, according to some example embodiments.

FIG. 11 is a flowchart illustrating a method 1100 for using formula dependencies, according to some example embodiments. Operations in the method 1100 may be performed by the invocation engine 106 (e.g., result module 118, dependency module 124) of the computing device 100 using components described above with respect to FIG. 1. Accordingly, the method 1100 is described by way of example with reference to the invocation engine 106. However, it shall be appreciated that at least some of the operations of the method 1100 may be deployed on various other hardware configurations or be performed by similar components residing elsewhere. Therefore, the method 1100 is not intended to be limited to the invocation engine 106.

In operation 1102, the result module 118 detects an empty cell in spill area. For example, the result module 118 while iterating over cells of the SDF cell table to obtain values may identify the empty cell. The cell may indicate a spill area that is associated with the cell.

In operation 1104, the dependency module 124 adds or takes a dependency on that spill area by adding the formula to a collection of formulas that depends from that spill area. Thus, for each spill area, there will be a collection of formulas that the dependency module 124 has declared to be dependent upon that spill area.

In operation 1106, the invocation engine 106 (e.g., the dependency module 123) detects that a dynamic array has spilled into that particular spill area. In response, the dependency module 124 iterates through all of the formulas that have added themselves as dependencies of that spill area and dirties all those formulas in operation 1108. The formulas are reevaluated and the results are displayed in operation 1110.

Figure 12:
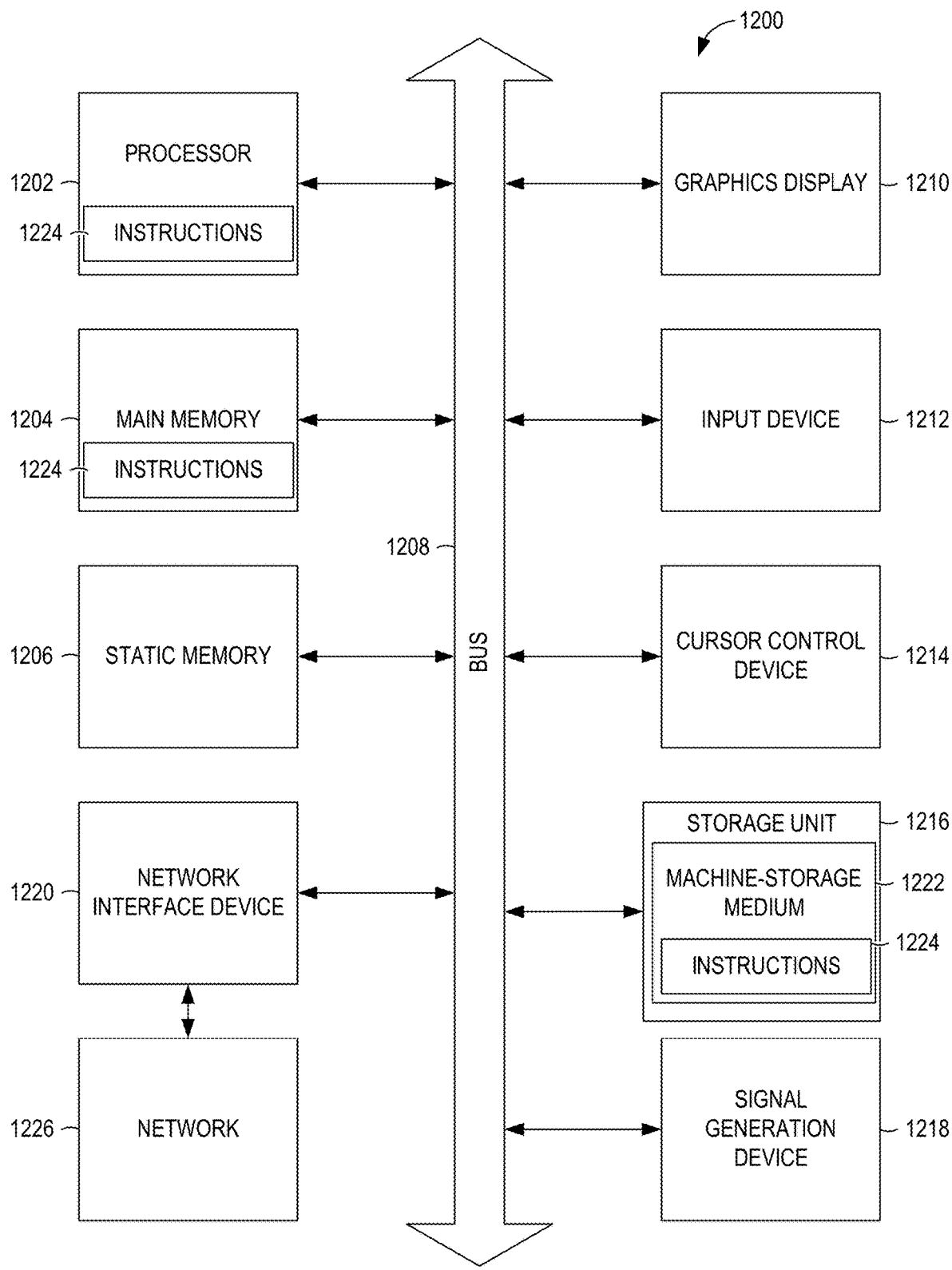
FIG. 12 is a block diagram illustrating components of a machine, according to some example embodiments, able to read instructions from a machine-storage medium and perform any one or more of the methodologies discussed herein.

FIG. 12 illustrates components of a machine 1200, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 12 shows a diagrammatic representation of the machine 1200 in the example form of a computer device (e.g., a computer) and within which instructions 1224 (e.g., software, a program, an application, an applet, an app, or other executable code) for causing the machine 1200 to perform any one or more of the methodologies discussed herein may be executed, in whole or in part.

In one embodiment, the instructions 1224 can transform the general, non-programmed machine 1200 into a particular machine (e.g., specially configured machine) programmed to carry out the described and illustrated functions in the manner described.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, or a cathode ray tube (CRT), or any other display capable of displaying graphics or video). The machine 1200 may also include an input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a sound card, an amplifier, a speaker, a headphone jack, or any suitable combination thereof), and a network interface device 1220.

The storage unit 1216 includes a machine-storage medium 1222 (e.g., a tangible machine storage medium) on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered as machine-readable media (e.g., tangible and non-transitory machine-readable media). The instructions 1224 may be transmitted or received over a network 1226 via the network interface device 1220.

In some example embodiments, the machine 1200 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1204, 1206, and/or memory of the processor(s) 1202 and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" (referred to collectively as "machine-storage medium 1222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1222 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1222 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1224 may further be transmitted or received over a communications network 1226 using a transmission medium via the network interface device 1220 and utilizing any one of a number of well-known transfer protocols (e.g., HTTP). Examples of communication networks 1226 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1224 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for efficient concurrent invocation of sheet defined functions. The method comprising receiving an indication to create a sheet defined function (SDF); in response to receiving the indication to create the SDF, generating the SDF, the generating of the SDF comprising, at a SDF creation time: based on a source cell table associated with a worksheet, generating a SDF cell table representing cells that are used on the worksheet; generating a formula table that indexes formulas used by the SDF, indices to the formula table being stored in cells of the SDF cell table; and based on dynamic arrays associated with the SDF, creating a spill area table comprising an index of spill areas where each of the dynamic arrays may automatically spill into; and subsequent to generating the cell table, formula table, and spill area table and in response to a plurality of invocations of the SDF, using, by one or more hardware processors, the SDF cell table, formula table, and spill area table to generate a result for each of the plurality of invocations, the SDF cell table, formula table, and spill area table being shared between the plurality of invocations.

In example 2, the subject matter of example 1 can optionally include wherein generating the result comprises changing an order of evaluation of the formulas for each specific invocation of the plurality of invocations using a calculation chain.

In example 3, the subject matter of any of examples 1-2 can optionally include wherein creating the spill area table comprises normalizing spans of the source cell table prior to generating the spill area table, the normalizing enabling fast lookup of a spill area that can spill into an unpopulated portion of the cell table; and performing the fast lookup of the spill area.

In example 4, the subject matter of any of examples 1-3 can optionally include wherein generating the result comprises utilizing a circular queue of one or more of the dynamic arrays when iterating over cells of the SDF cell table to obtain cell values.

In example 5, the subject matter of any of examples 1-4 can optionally include, during invocation, detecting that a currently empty cell is in a potential spill area; in response to the detecting, recording a formula dependency on the potential dynamic array spill area; subsequently detecting that a dynamic array has spilled into the potential dynamic spill area; and in response to subsequently detecting that the dynamic array has spilled into the potential dynamic spill area, reevaluating a formula associated with the formula dependency.

In example 6, the subject matter of any of examples 1-5 can optionally include wherein the SDF cell table comprises cells containing an index to a formula in the formula table.

In example 7, the subject matter of any of examples 1-6 can optionally include wherein using the SDF cell table, formula table, and spill area table to generate the result comprises sharing the SDF cell table, formula table, and spill area table for every invocation of the SDF; and for each invocation of the SDF, storing results for each formula including different spill areas for each dynamic array separately.

Example 8 is a system for efficient concurrent invocation of sheet defined functions. The system includes one or more processors and a storage device storing instructions that, when executed by the one or more hardware processors, causes the one or more hardware processors to perform operations comprising receiving an indication to create a sheet defined function (SDF); in response to receiving the indication to create the SDF, generating the SDF, the generating of the SDF comprising, at a SDF creation time: based on a source cell table associated with a worksheet, generating a SDF cell table representing cells that are used on the worksheet; generating a formula table that indexes formulas used by the SDF, indices to the formula table being stored in cells of the SDF cell table; and based on dynamic arrays associated with the SDF, creating a spill area table comprising an index of spill areas where each of the dynamic arrays may automatically spill into; and subsequent to generating the cell table, formula table, and spill area table and in response to a plurality of invocations of the SDF, using the SDF cell table, formula table, and spill area table to generate a result for each of the plurality of invocations, the SDF cell table, formula table, and spill area table being shared between the plurality of invocations.

In example 9, the subject matter of example 8 can optionally include wherein generating the result comprises changing an order of evaluation of the formulas for each specific invocation of the plurality of invocations using a calculation chain.

In example 10, the subject matter of any of examples 8-9 can optionally include wherein creating the spill area table comprises normalizing spans of the source cell table prior to generating the spill area table, the normalizing enabling fast lookup of a spill area that can spill into an unpopulated portion of the cell table; and performing the fast lookup of the spill area.

In example 11, the subject matter of any of examples 8-10 can optionally include wherein generating the result comprises utilizing a circular queue of one or more of the dynamic arrays when iterating over cells of the SDF cell table to obtain cell values.

In example 12, the subject matter of any of examples 8-11 can optionally include wherein the operations further comprise during invocation, detecting that a currently empty cell is in a potential spill area; in response to the detecting, recording a formula dependency on the potential dynamic array spill area; subsequently detecting that a dynamic array has spilled into the potential dynamic spill area; and in response to subsequently detecting that the dynamic array has spilled into the potential dynamic spill area, reevaluating a formula associated with the formula dependency.

In example 13, the subject matter of any of examples 8-12 can optionally include wherein the SDF cell table comprises cells containing an index to a formula in the formula table.

In example 14, the subject matter of any of examples 8-13 can optionally include wherein using the SDF cell table, formula table, and spill area table to generate the result comprises sharing the SDF cell table, formula table, and spill area table for every invocation of the SDF; and for each invocation of the SDF, storing results for each formula including different spill areas for each dynamic array separately.

Example 15 is a machine-storage medium storing instructions for efficient concurrent invocation of sheet defined functions. The instructions, when executed by one or more processors of a machine, cause the machine to perform operations comprising receiving an indication to create a sheet defined function (SDF); in response to receiving the indication to create the SDF, generating the SDF, the generating of the SDF comprising, at a SDF creation time: based on a source cell table associated with a worksheet, generating a SDF cell table representing cells that are used on the worksheet; generating a formula table that indexes formulas used by the SDF, indices to the formula table being stored in cells of the SDF cell table; and based on dynamic arrays associated with the SDF, creating a spill area table comprising an index of spill areas where each of the dynamic arrays may automatically spill into; and subsequent to generating the cell table, formula table, and spill area table and in response to a plurality of invocations of the SDF, using the SDF cell table, formula table, and spill area table to generate a result for each of the plurality of invocations, the SDF cell table, formula table, and spill area table being shared between the plurality of invocations In example 16, the subject matter of example 15 can optionally include wherein generating the result comprises changing an order of evaluation of the formulas for each specific invocation of the plurality of invocations using a calculation chain.

In example 17, the subject matter of any of examples 15-16 can optionally include wherein creating the spill area table comprises normalizing spans of the source cell table prior to generating the spill area table, the normalizing enabling fast lookup of a spill area that can spill into an unpopulated portion of the cell table; and performing the fast lookup of the spill area.

In example 18, the subject matter of any of examples 15-17 can optionally include wherein generating the result comprises utilizing a circular queue of one or more of the dynamic arrays when iterating over cells of the SDF cell table to obtain cell values.

In example 19, the subject matter of any of examples 15-18 can optionally include wherein the operations further comprise during invocation, detecting that a currently empty cell is in a potential spill area; in response to the detecting, recording a formula dependency on the potential dynamic array spill area; subsequently detecting that a dynamic array has spilled into the potential dynamic spill area; and in response to subsequently detecting that the dynamic array has spilled into the potential dynamic spill area, reevaluating a formula associated with the formula dependency.

In example 20, the subject matter of any of examples 15-19 can optionally include wherein using the SDF cell table, formula table, and spill area table to generate the result comprises sharing the SDF cell table, formula table, and spill area table for every invocation of the SDF; and for each invocation of the SDF, storing results for each formula including different spill areas for each dynamic array separately.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
    receiving an indication to create a sheet defined function (SDF);
    in response to receiving the indication to create the SDF, generating the SDF, the generating of the SDF comprising, at a SDF creation time:
    based on a source cell table associated with a worksheet, generating a SDF cell table representing cells that are used on the worksheet;
    generating a formula table that indexes formulas used by the SDF, indices to the formula table being stored in cells of the SDF cell table; and
    based on dynamic arrays associated with the SDF, creating a spill area table comprising an index of spill areas where each of the dynamic arrays may automatically spill into; and
    subsequent to generating the SDF cell table, formula table, and spill area table and in response to a plurality of invocations of the SDF, using, by one or more hardware processors, the SDF cell table, formula table, and spill area table to generate a result for each of the plurality of invocations, wherein the SDF cell table, formula table, and spill area table are shared between the plurality of invocations.

2. The computer-implemented method of claim 1, wherein generating the result comprises:
    changing an order of evaluation of the formulas for each specific invocation of the plurality of invocations using a calculation chain.

3. The computer-implemented method of claim 1, wherein creating the spill area table comprises:
    normalizing spans of the source cell table prior to generating the spill area table, the normalizing enabling fast lookup of a spill area that can spill into an unpopulated portion of the SDF cell table; and
    performing the fast lookup of the spill area.

4. The computer-implemented method of claim 1, wherein generating the result comprises:
    utilizing a circular queue of one or more of the dynamic arrays when iterating over cells of the SDF cell table to obtain cell values.

5. The computer-implemented method of claim 1, further comprising:
    during invocation, detecting that a currently empty cell is in a potential spill area, in response to the detecting, recording a formula dependency on the potential spill area;
    subsequently detecting that a dynamic array has spilled into the potential spill area; and
    in response to subsequently detecting that the dynamic array has spilled into the potential spill area, reevaluating a formula associated with the formula dependency.

6. The computer-implemented method of claim 1, wherein the SDF cell table comprises cells containing an index to a formula in the formula table.

7. The computer-implemented method of claim 1, wherein:
    using the SDF cell table, formula table, and spill area table to generate the result comprises sharing the SDF cell table, formula table, and spill area table for every invocation of the SDF; and
    for each invocation of the SDF, storing results for each formula including different spill areas for each dynamic array separately.

8. A system comprising:
one or more hardware processors, and
a storage device storing instructions that, when executed by the one or more hardware processors, causes the one or more hardware processors to perform operations comprising:
receiving an indication to create a sheet defined function (SDF);
in response to receiving the indication to create the SDF, generating the SDF, the generating of the SDF comprising, at a SDF creation time:
based on a source cell table associated with a worksheet, generating a SDF cell table representing cells that are used on the worksheet;
generating a formula table that indexes formulas used by the SDF, indices to the formula table being stored in cells of the SDF cell table; and
based on dynamic arrays associated with the SDF, creating a spill area table comprising an index of spill areas where each of the dynamic arrays may automatically spill into, and
subsequent to generating the SDF cell table, formula table, and spill area table and in response to a plurality of invocations of the SDF, using the SDF cell table, formula table, and spill area table to generate a result for each of the plurality of invocations, wherein the SDF cell table, formula table, and spill area table are shared between the plurality of invocations.

9. The system of claim 8, wherein generating the result comprises:
changing an order of evaluation of the formulas for each specific invocation of the plurality of invocations using a calculation chain.

10. The system of claim 8, wherein creating the spill area table comprises:
normalizing spans of the source cell table prior to generating the spill area table, the normalizing enabling fast lookup of a spill area that can spill into an unpopulated portion of the SDF cell table; and
performing the fast lookup of the spill area.

11. The system of claim 8, wherein generating the result comprises:
utilizing a circular queue of one or more of the dynamic arrays when iterating over cells of the SDF cell table to obtain cell values.

12. The system of claim 8, wherein the operations further comprise:
during invocation, detecting that a currently empty cell is in a potential spill area,
in response to the detecting, recording a formula dependency on the potential spill area;
subsequently detecting that a dynamic array has spilled into the potential spill area; and
in response to subsequently detecting that the dynamic array has spilled into the potential spill area, reevaluating a formula associated with the formula dependency.

13. The system of claim 8, wherein the SDF cell table comprises cells containing an index to a formula in the formula table.

14. The system of claim 8, wherein:
using the SDF cell table, formula table, and spill area table to generate the result comprises sharing the SDF cell table, formula table, and spill area table for every invocation of the SDF, and
for each invocation of the SDF, storing results for each formula including different spill areas for each dynamic array separately.

15. A computer-storage medium comprising instructions which, when executed by one or more processors of a machine, cause the machine to perform operations comprising:
receiving an indication to create a sheet defined function (SDF),
in response to receiving the indication to create the SDF, generating the SDF, the generating of the SDF comprising, at a SDF creation time:
based on a source cell table associated with a worksheet, generating a SDF cell table representing cells that are used on the worksheet;
generating a formula table that indexes formulas used by the SDF, indices to the formula table being stored in cells of the SDF cell table; and
based on dynamic arrays associated with the SDF, creating a spill area table comprising an index of spill areas where each of the dynamic arrays may automatically spill into, and
subsequent to generating the SDF cell table, formula table, and spill area table and in response to a plurality of invocations of the SDF, using the SDF cell table, formula table, and spill area table to generate a result for each of the plurality of invocations, wherein the SDF cell table, formula table, and spill area table are shared between the plurality of invocations.

16. The computer-storage medium of claim 15, wherein generating the result comprises:
changing an order of evaluation of the formulas for each specific invocation of the plurality of invocations using a calculation chain.

17. The computer-storage medium of claim 15, wherein creating the spill area table comprises:
normalizing spans of the source cell table prior to generating the spill area table, the normalizing enabling fast lookup of a spill area that can spill into an unpopulated portion of the SDF cell table, and
performing the fast lookup of the spill area.

18. The computer-storage medium of claim 15, wherein generating the result comprises:
utilizing a circular queue of one or more of the dynamic arrays when iterating over cells of the SDF cell table to obtain cell values.

19. The computer-storage medium of claim 15, wherein the operations further comprise:
during invocation, detecting that a currently empty cell is in a potential spill area,
in response to the detecting, recording a formula dependency on the potential spill area;
subsequently detecting that a dynamic array has spilled into the potential spill area; and
in response to subsequently detecting that the dynamic array has spilled into the potential spill area, reevaluating a formula associated with the formula dependency.

20. The computer-storage medium of claim 15, wherein:
using the SDF cell table, formula table, and spill area table to generate the result comprises sharing the SDF cell table, formula table, and spill area table for every invocation of the SDF; and
for each invocation of the SDF, storing results for each formula including different spill areas for each dynamic array separately.

* * * * *